(12) United States Patent
Kasahara et al.

(10) Patent No.: US 10,558,265 B2
(45) Date of Patent: Feb. 11, 2020

(54) INPUT DEVICE AND SYSTEM OF INPUT DEVICE

(71) Applicant: SEMICONDUCTOR ENERGY LABORATORY CO., LTD., Atsugi-shi, Kanagawa-ken (JP)

(72) Inventors: Takahiro Kasahara, Gunma (JP); Hideaki Kuwabara, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 6 days.

(21) Appl. No.: 15/366,200

(22) Filed: Dec. 1, 2016

(65) Prior Publication Data
US 2017/0168575 A1 Jun. 15, 2017

(51) Int. Cl.
| G06F 3/01 | (2006.01) |
| G06F 1/16 | (2006.01) |
| G06F 3/041 | (2006.01) |
| G06F 3/0488 | (2013.01) |
| G09G 5/38 | (2006.01) |

(52) U.S. Cl.
CPC .......... G06F 3/016 (2013.01); G06F 1/1652 (2013.01); G06F 3/0416 (2013.01); G06F 3/04886 (2013.01); G09G 5/38 (2013.01); G06F 2203/04102 (2013.01)

(58) Field of Classification Search
CPC ........ G06F 3/016; G06F 3/0416; G06F 3/044; G06F 3/04886; G06F 1/1626; G06F 1/1635; G06F 1/1643; G06F 1/1652; G06F 2203/04102; G06F 2203/04111; G09G 3/3426; G09G 5/38

USPC ......................................................... 345/173
See application file for complete search history.

(56) References Cited

U.S. PATENT DOCUMENTS

| 8,355,004 | B2 | 1/2013 | Sato et al. |
| 9,184,211 | B2 | 11/2015 | Hirakata |
| 9,229,481 | B2 | 1/2016 | Jinbo |
| 9,406,898 | B2 | 8/2016 | Yamazaki et al. |
| D770,447 | S | 11/2016 | Endoa et al. |
| D770,448 | S | 11/2016 | Endoa et al. |
| 2009/0289911 | A1* | 11/2009 | Nagai ............... G06F 3/041 345/173 |
| 2011/0001801 | A1* | 1/2011 | Misawa ............ H04N 5/23293 348/49 |
| 2011/0102335 | A1* | 5/2011 | Miyamura ........ G06F 3/04886 345/173 |

(Continued)

FOREIGN PATENT DOCUMENTS

JP 2011-100259 A 5/2011

*Primary Examiner* — Mark Edwards
(74) *Attorney, Agent, or Firm* — Nixon Peabody LLP; Jeffrey L. Costellia

(57) ABSTRACT

An input device having flexibility includes a display portion, a touch panel, a haptic element, a haptic controller, and a control portion. The touch panel is configured to acquire information on the size of a user's body part operating the input device and transmit the information to the control portion. The control portion is configured to receive the information, generate information on the positioning of a plurality of buttons, and transmit the information to the display portion. The display portion is configured to display the plurality of buttons on the basis of the received information. The haptic controller is configured to transmit information on a haptic effect to the haptic element.

3 Claims, 17 Drawing Sheets

(56) References Cited

U.S. PATENT DOCUMENTS

| | | | |
|---|---|---|---|
| 2013/0083496 A1* | 4/2013 | Franklin | G06F 1/1626 361/749 |
| 2013/0265221 A1* | 10/2013 | Lee | G06F 3/01 345/156 |
| 2013/0285922 A1* | 10/2013 | Alberth, Jr. | G06F 1/1694 345/173 |
| 2014/0066195 A1* | 3/2014 | Matsui | A63F 13/42 463/30 |
| 2014/0104508 A1 | 4/2014 | Yamazaki et al. | |
| 2014/0267046 A1* | 9/2014 | Ellsworth | G06F 3/04886 345/168 |
| 2014/0361980 A1 | 12/2014 | Iwaki et al. | |
| 2014/0375660 A1 | 12/2014 | Tamaki | |
| 2015/0009128 A1 | 1/2015 | Matsumoto | |
| 2015/0062525 A1 | 3/2015 | Hirakata | |
| 2015/0128079 A1* | 5/2015 | Kim | G06F 3/04883 715/767 |
| 2015/0138072 A1 | 5/2015 | Yamazaki et al. | |
| 2015/0153861 A1 | 6/2015 | Yamazaki et al. | |
| 2015/0153862 A1 | 6/2015 | Nakamura et al. | |
| 2015/0154730 A1 | 6/2015 | Hirakata et al. | |
| 2015/0261332 A1 | 9/2015 | Nakamura et al. | |
| 2015/0309637 A1 | 10/2015 | Sakuishi et al. | |
| 2015/0311260 A1 | 10/2015 | Senda et al. | |
| 2015/0316958 A1 | 11/2015 | Takesue | |
| 2015/0316995 A1 | 11/2015 | Tamaki | |
| 2015/0317014 A1 | 11/2015 | Miyake et al. | |
| 2015/0317015 A1 | 11/2015 | Eguchi et al. | |
| 2015/0317265 A1 | 11/2015 | Iwaki et al. | |
| 2015/0346776 A1 | 12/2015 | Miyake | |
| 2015/0346867 A1 | 12/2015 | Miyake | |
| 2015/0349041 A1 | 12/2015 | Miyake | |
| 2015/0355763 A1 | 12/2015 | Miyake et al. | |
| 2016/0056224 A1 | 2/2016 | Hirakata | |
| 2016/0070314 A1 | 3/2016 | Takahashi et al. | |
| 2016/0109998 A1 | 4/2016 | Watanabe | |
| 2016/0116941 A1 | 4/2016 | Kuwabara et al. | |
| 2016/0154268 A1 | 6/2016 | Yamazaki et al. | |
| 2016/0155984 A1 | 6/2016 | Yamazaki et al. | |
| 2016/0187930 A1 | 6/2016 | Jinbo | |
| 2016/0269515 A1 | 9/2016 | Yamazaki et al. | |

* cited by examiner

100

100

100

100

100

INPUT DEVICE AND SYSTEM OF INPUT DEVICE

BACKGROUND OF THE INVENTION

1. Field of the Invention

One embodiment of the present invention relates to an input device having flexibility. Another embodiment of the present invention relates to an input device capable of being customized. Another embodiment of the present invention relates to an input device having a stimulus outputting function to stimulate user's sense of touch. Another embodiment of the present invention relates to a system of the input device. Another embodiment of the present invention relates to a system that determines and displays the position of a button in the input device capable of being customized.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a memory device, a method for driving any of them, and a method for manufacturing any of them.

In this specification and the like, a semiconductor device refers to any device that can function by utilizing semiconductor characteristics. A transistor and a semiconductor circuit are embodiments of semiconductor devices. A memory device, a display device, an imaging device, and an electronic device include a semiconductor device in some cases.

2. Description of the Related Art

Modern human life is surrounded by a wide variety of devices and machines, whose types and functions have been increasing over the years. Almost all of the devices and machines require input devices, which are necessary in order that a user properly operates the devices and machines as they are expected. In other words, human beings are surrounded by a variety of input devices as well as a variety of devices and machines.

A remote controller is an example of the input device for operating television sets. A keyboard and a mouse are examples of the input device for operating personal computers. A controller is an example of the input device for operating game consoles. Furthermore, operation buttons of household washing machines and industrial machines are naturally included in the category of the input device.

There are a variety of input devices that are connected to different kinds of devices and machines and are expected to be operated in different ways. In some devices and machines, users can exchange only the input devices to suit their preference and improve the ease of use, and a wide variety of corresponding input devices have been put on the market. With complicated operation of devices and machines, the user's intention needs to be input accurately and specifically. Thus, the input device capable of complicated operation, such as the one with an increased number of buttons or the one incorporating an analog stick, has come on the market. However, the physique and preference differ between genders and ages, and thus an input device optimized for a user is not necessarily suitable for another user.

For game consoles, the development of controllers has been promoted so that hardware could be customized to some extent in accordance with the physique and preference of an individual player. For example, in the "Xbox Elite Wireless Controller" launched by Microsoft Corporation, buttons and sticks on the controller can be interchanged with attachments so as to select the button shape and change the stick length. The controller with customized hardware adapts to the user's unique style of play.

However, even such a controller cannot adapt to all users because they cannot change the positions of buttons and sticks, the number of buttons, and the shape of the controller housing. The controller cannot deal with the situation in which hand size generally differs between adults and children and right-handed and left-handed users operate the device in a different way.

In recent years, devices incorporating input devices with touch panels have been widely used as typified by smartphones and tablet PCs. Interface functions such as input buttons are displayed on a display portion integrated with a touch panel, and users can touch an image displayed as an operation button as if they press a physical button. A PC keyboard using a touch panel that functions as keys is known (Patent Document 1). However, with a flat housing and a constant key size, like commonly used PC keyboards, the touch panel keyboard cannot be an input device suitable for all users with different physiques. Furthermore, the flat keyboard gives less sense of pressing buttons than three-dimensional common keyboards.

REFERENCE

Patent Document

[Patent Document 1] Japanese Published Patent Application No. 2011-100259

SUMMARY OF THE INVENTION

The following is one of the most advanced uses for haptic input devices that have been researched. The surgeon's sense in surgery is transmitted to another doctor or machine; specifically, the surgeon expert's hand movement, fingertips sense, strength to grip a tool, and the like are transmitted to trainee doctors so that they improve their surgery techniques. In addition, the hand movement of a surgeon is transmitted to a machine and recreated to perform remote surgery, which requires an input device adapting to the physique an individual surgeon and a haptic input device capable of sensing slight movement. Other than the advanced uses shown above, the input device needs to be used to acquire haptic information on the strength to hold the input device, the button pressing pressure, and the like.

Furthermore, attention and expectations are largely focused on input devices configured to change the position of a button and even the shape of a housing in accordance with the user's preference. These input devices are versatile and a single input device can have different functions.

In view of the above, an object of one embodiment of the present invention is to provide an input device having flexibility. Another object of one embodiment of the present invention is to provide an input device configured to change the position of an input button almost continuously. Another object of one embodiment of the present invention is to provide an input device configured to input the sense of touch. Another object of one embodiment of the present invention is to provide a device having a function of a tactile display capable of transmitting detailed information on the sense of touch to a user. Another object of one embodiment of the present invention is to provide an input device capable of having plural uses in one housing. Another object of one embodiment of the present invention is to provide an input device configured to change the input environment in accordance with an individual user's physique or preference, or the usage purpose or environment. Another object of one embodiment of the present invention is to provide a system that determines and displays the position of a button in an input device configured to change the input environment. Another object of one embodiment of the present invention is to provide a novel input device. Another object of one embodiment of the present invention is to provide a novel semiconductor device.

Note that the description of these objects does not preclude the existence of other objects. In one embodiment of the present invention, there is no need to achieve all the objects. Other objects will be apparent from and can be derived from the description of the specification, the drawings, the claims, and the like.

One embodiment of the present invention is an input device having flexibility, which includes a display portion and a touch panel overlapping with the display portion. The display portion is configured to display a button image. The display portion is configured to change the position where the button image is displayed.

Another embodiment of the present invention is an input device having flexibility, which includes a display portion, a touch panel overlapping with the display portion, a haptic element, and a haptic controller. The display portion is configured to display a button image. The display portion is configured to change the position where the button image is displayed. The haptic element is configured to produce a haptic effect. The haptic controller is configured to transmit information on the haptic effect to the haptic element.

Another embodiment of the present invention is an input device having flexibility, which includes a display portion, a touch panel overlapping with the display portion, a haptic element, a haptic controller, and a memory portion. The memory portion includes information on the position of a button image displayed on the display portion or information on preset button positioning. The display portion is configured to display a button image on the basis of the information on the position of the button image displayed on the display portion or the information on the preset button positioning. The display portion is configured to change the position where the button image is displayed. The haptic element is configured to produce a haptic effect. The haptic controller is configured to transmit information on the haptic effect to the haptic element.

Another embodiment of the present invention is an input device having flexibility, which includes a display portion, a touch panel overlapping with the display portion, a haptic element, a haptic controller, and a memory portion. The touch panel is configured to read the size of a hand on the touch panel and transmit information on the hand size to the memory portion. The memory portion includes information on the position of a button image displayed on the display portion or information on preset button positioning. The display portion is configured to display a button image on the basis of the information on the position of the button image displayed on the display portion or the information on the preset button positioning, and also on the basis of the information on the hand size. The display portion is configured to change the position where the button image is displayed. The haptic element is configured to produce a haptic effect. The haptic controller is configured to transmit information on the haptic effect to the haptic element.

Another embodiment of the present invention is the input device having flexibility mentioned in any one of the above, which also includes a haptic input element. The haptic input element is configured to sense vibration, temperature, or pressure.

Another embodiment of the present invention is the input device having flexibility mentioned in any one of the above, in which the display portion is also configured to display information.

Another embodiment of the present invention is the input device having flexibility mentioned in any one of the above, in which the touch panel includes part of a base of the display portion as a base.

Another embodiment of the present invention is the input device having flexibility mentioned in any one of the above, which also includes, between the touch panel and the display portion, an element configured to lift up part of the touch panel.

Another embodiment of the present invention is the input device having flexibility mentioned in any one of the above, in which the display portion includes an OLED panel having flexibility.

Another embodiment of the present invention is the input device having flexibility mentioned in any one of the above, in which the display portion is configured to display a control pad and an input button to be used for the operation of a game console.

Another embodiment of the present invention is the input device having flexibility mentioned in any one of the above, which also includes a storage battery.

Another embodiment of the present invention is the input device having flexibility mentioned above, in which the storage battery has flexibility.

Another embodiment of the present invention is the input device having flexibility mentioned in any one of the above, in which the storage battery is a lithium-ion storage battery.

Another embodiment of the present invention is the input device having flexibility mentioned in any one of the above, in which at least part of the storage battery overlaps with the display portion.

Another embodiment of the present invention is the input device having flexibility mentioned in any one of the above, in which the storage battery is mounted on an edge of the input device.

One embodiment of the present invention is a system of an input device including a display portion, a touch panel, and a control portion. The touch panel is configured to acquire first information on the size of at least part of a user's body part operating the input device and transmit the first information to the control portion. The control portion is configured to receive the first information, generate second information on the positioning of a plurality of buttons, and transmit the second information to the display portion. The display portion is configured to display the plurality of buttons on the basis of the received second information.

Another embodiment of the present invention is a system of an input device including a display portion, a touch panel, and a control portion. The touch panel is configured to acquire first information on the size of at least part of a user's hand and transmit the first information to the control portion. The control portion is configured to receive the first information, generate second information on the positioning of a plurality of buttons, and transmit the second information to the display portion. The display portion is configured to display the plurality of buttons on the basis of the received second information.

Another embodiment of the present invention is a system of an input device including a display portion including a touch panel, and a control portion. The touch panel is configured to acquire first information on the size of at least part of a user's hand and transmit the first information to the control portion. The control portion is configured to receive the first information, generate second information on the positioning of a plurality of buttons, and transmit the second information to the display portion. The display portion is configured to display the plurality of buttons on the basis of the received second information.

Another embodiment of the present invention is the system of the input device mentioned in any of the above, in which the input device further includes a memory portion, and the memory portion is configured to store the first information or the second information.

One embodiment of the present invention is a system of an input device including a display portion, a touch panel, a control portion, and a housing. The display portion is configured to display a screen to instruct the input device to be put on a plane surface, and display a screen to instruct a user to put his/her hand on the touch panel. The touch panel is configured to acquire first information on the size of at least part of a user's hand and transmit the first information to the control portion. The display portion is configured to display a screen to instruct the user to change the shape of the housing suitably. The housing is configured to acquire second information on the shape of the housing and transmit the second information to the control portion. The control portion is configured to receive the first information and the second information. The control portion is configured to adjust preset button positioning on the basis of the first information and the second information, generate third information on the adjusted preset button positioning, and transmit the third information to the display portion. The display portion is configured to display a plurality of buttons on the basis of the received third information. The input device is configured to customize the positions and sizes of the plurality of buttons. The input device is configured to generate fourth information on the positioning of the plurality of buttons from the customized positions, store the fourth information, and transmit the fourth information to the display portion. The display portion is configured to display the plurality of buttons on the basis of the received fourth information.

One embodiment of the present invention is an input device configured to display a button in a display portion in the position determined by any of the above systems, and inform a user of the button held down when the button held down is sensed by the touch panel.

According to one embodiment of the present invention, an input device having flexibility can be provided. Alternatively, an input device configured to change the position of an input button almost continuously can be provided. Alternatively, an input device configured to input the sense of touch can be provided. Alternatively, a device having a function of a tactile display capable of transmitting detailed information on the sense of touch to a user can be provided. Alternatively, an input device capable of having plural uses in one housing can be provided. Alternatively, an input device configured to change the input environment in accordance with an individual user's physique or preference, or the usage purpose or environment can be provided. Alternatively, a system that determines and displays the position of a button in an input device configured to change the input environment can be provided. Alternatively, a novel input device can be provided. Alternatively, a novel semiconductor device can be provided.

Note that the effects of one embodiment of the present invention are not limited to those listed above. For example, one embodiment of the present invention has another effect depending on circumstances or conditions. Furthermore, one embodiment of the present invention does not have any of the above effects depending on circumstances or conditions.

DETAILED DESCRIPTION OF THE INVENTION

Figure 1A:
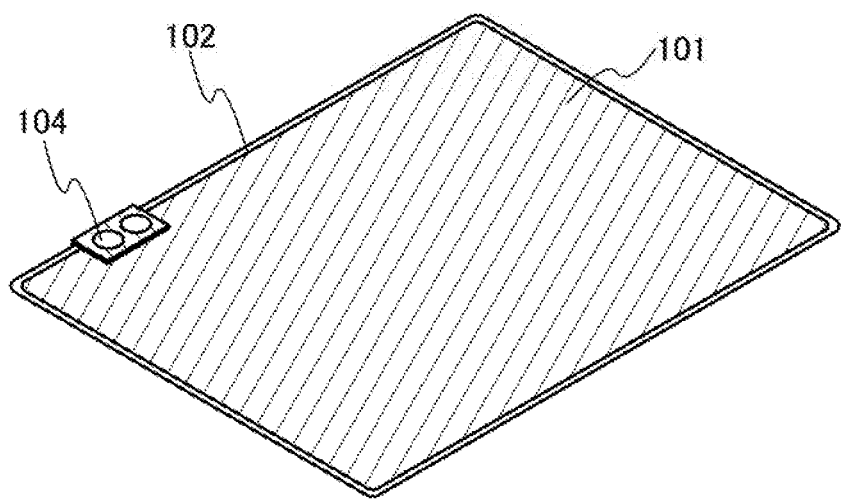
FIGS. 1A and 1B illustrate an input device.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and the description of such portions is not repeated in some cases. It is also to be noted that the same components are denoted by different hatching patterns in different drawings, or the hatching patterns are omitted in some cases.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. The term "perpendicular" indicates that the angle formed between two straight lines is greater than or equal to 80° and less than or equal to 100°, and accordingly also includes the case where the angle is greater than or equal to 85° and less than or equal to 95°. In addition, the term "substantially perpendicular" indicates that the angle formed between two straight lines is greater than or equal to 60° and less than or equal to 120°.

In this specification, trigonal and rhombohedral crystal systems are included in a hexagonal crystal system.

In this specification, an "input device" refers to a device having a function of supplying data, information, signals, commands, and the like to another device and the like through wired or wireless communication. The input device may have another function and may include a display portion, a speaker, a vibrator, or the like to serve as an "output device" outputting light, sound, vibration, or the like to stimulate users. Furthermore, the input device may include an information processing function, and devices such as a portable game console, a laptop PC, and a controller with a screen, which have functions as an input device, an output device, and an information processing function, are included in the category of the input device in this specification.

(Embodiment 1)

In this embodiment, an input device 100 of one embodiment of the present invention will be described with reference to drawings.

FIG. 1A is a bird's eye view schematically showing the input device 100 of one embodiment of the present invention. The input device 100 includes a touch panel 101, a housing 102, a physical button 104, and a display portion overlapping with the touch panel. Note that in this specification and the like, the physical button refers to a button different from the button that is displayed on the display portion of the input device and pressed on the touch panel. The input device 100 does not necessarily include the physical button. Furthermore, a control portion may be provided in any place of the input device 100, e.g., on the rear surface of the input device 100. The input device 100 does not necessarily include the control portion. The input device 100 may be connected to an external power source or include a storage battery. The storage battery may have flexibility so as to change in shape with the deformation of the input device. In addition, the input device 100 may transmit a signal to an external device. Note that the input device 100 may be connected to the external device with or without a wire.

Moreover, to achieve a haptic function, a vibrator and a haptic controller may be provided. A heat generator may be provided instead of the vibrator. A component for changing the texture of the surface of the touch panel may also be provided. It is also possible to provide a component for partially injecting a liquid between the touch panel and the housing and lifting up part of the touch panel.

<Use Mode of Input Device 100>

Figure 1B:
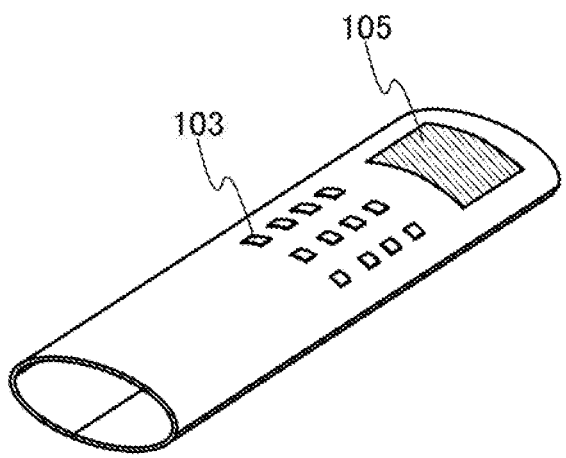

The input device 100 of one embodiment of the present invention has flexibility. That is, the touch panel 101 and the housing 102 have flexibility so that a user can change the shape of the input device 100 in accordance with the intended use. For example, in the case where the input device 100 of one embodiment of the present invention is used as a television or air conditioner remote controller, the input device can be rolled up as illustrated in FIG. 1B. In that case, the remote controller can be used while wrapped around the user's arm or finger, so that the disabled, visually, physically, or motionally impaired can operate a machine, a computer, an assistance tool, or the like. In addition, the aforementioned usage enables hands-free operation in the case where, for example, an industrial machine is operated in a factory, a construction machine is remotely operated in a building site, and goods are loaded and unloaded in a distribution warehouse. This allows workers to work with neither remote controller nor operation tool held in their hands, easing their workload, improving the work environment, and offering a wider variety of work. The input device 100 of one embodiment of the present invention may sense a change in its shape to find out the use intended by a user, and display a button in a position suitable for the use. The portion where the button 103 is displayed may be lifted up by the aforementioned function of lifting up part of the touch panel, in which case the user feels as if he/she has pressed a button on a common remote controller when pressing the lifted displayed button. The input device 100 may display images or information other than the operation button. For example, when the input device 100 is used as a television remote controller, a television program listing or program information may be displayed on an information display portion 105. The input device 100 may also be configured to inform the user of sensing of the operation button held down with the vibration of a vibrator.

Figure 2A:
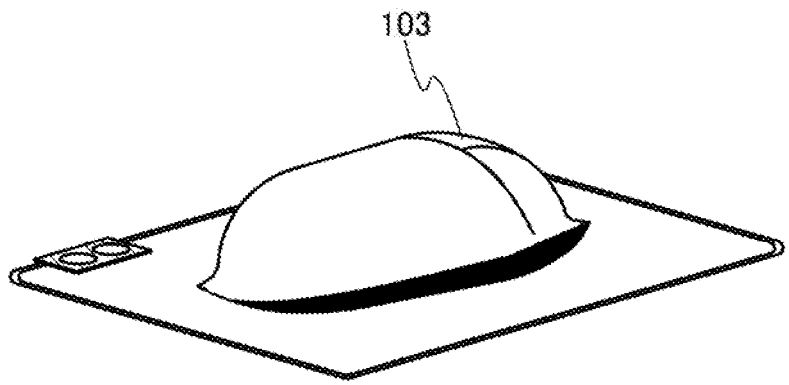
FIGS. 2A to 2C illustrate use examples of an input device.

The input device 100 of one embodiment of the present invention, which has flexibility, can be used while covering another object. For example, FIG. 2A illustrates the input device 100 of one embodiment of the present invention that covers an elliptical object. The input device 100 having flexibility can reflect the shape of the elliptical object to be deformed as illustrated in FIG. 2A.

When two buttons are displayed around an edge of the elliptical object, the input device 100 reflecting the shape of the elliptical object can function as a PC mouse. When a user gently holds the elliptical shape in the initial setting, the input device 100 functioning as a PC mouse may sense the hand size of the user to display the button 103 in a position suitable for the user's hand. In order to move a cursor in a PC or the like connected to the input device 100 functioning as a PC mouse, for example, an acceleration sensor is provided in the input device 100 to sense the movement of the input device 100. A light source and an optical sensor may be provided on the bottom of the elliptical object or part of the rear surface of the input device. In that case, information sensed by the sensor is transmitted to the input device 100 and the input device 100 can sense the movement as an optical mouse.

Figure 2B:
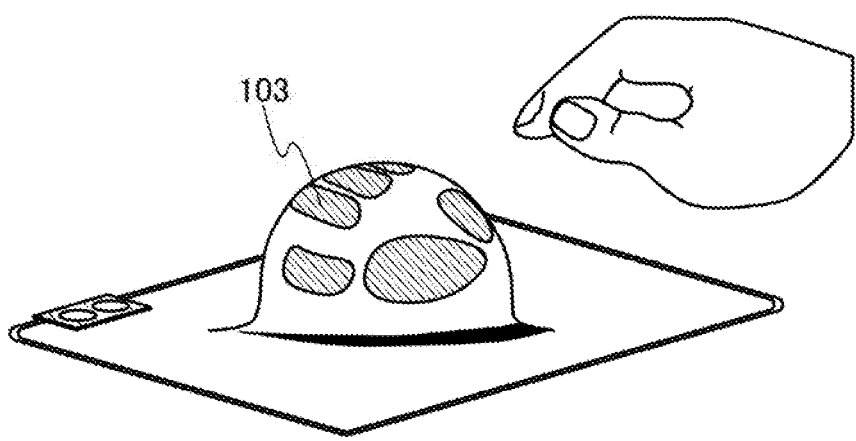

FIG. 2B illustrates the input device 100 of one embodiment of the present invention that covers a spherical object. The input device 100 having flexibility can reflect the shape of the object to be deformed as illustrated in FIG. 2B.

When a user puts his/her hand on the input device 100 reflecting the spherical shape as he/she holds a sphere, for example, information on the grip of a pitcher throwing a ball can be input. In a baseball game, a pitch from the pitcher may be selected according to the input information on the grip. When the input device 100 is connected to a pitching training machine, a good pitcher may input information on his/her grip, so that the training machine stores the information and provides the information to a pitcher in training. In the input device 100, the buttons 103 touched by the user's fingers and palm may be displayed in a position suitable for the user's hand, so that the user can input information.

Figure 2C:
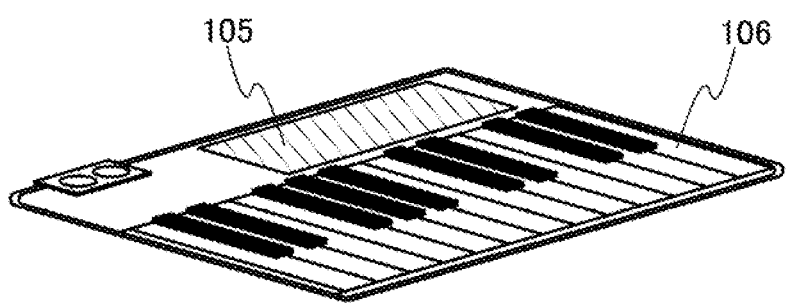

The input device 100 of one embodiment of the present invention, which has flexibility, may be placed on a plane so as to be used as a planar touch panel input device. For example, as illustrated in FIG. 2C, the input device 100 placed on a plane and displaying a keyboard 106 can function as an electronic musical instrument. Furthermore, the input device can be lifted up by the function of partly lifting the input device; for example, only black keys of the keyboard 106 may be lifted up so as to look like the actual keyboard. In addition, white keys may also be slightly lifted up so that a user has the sense of pressing a key, and furthermore, a haptic actuator may vibrate when sensing the key held down to transmit the vibration to the user. The information display portion 105 may be provided in a region where the touch panel keyboard is not displayed, and may display music, a setting screen, or the like. The next key to be pressed may be highlighted (in color other than white and black, for example) to be distinguished from the other keys, which assists the player with displayed music.

Keyboard instruments typified by the piano have keys with constant positions and sizes, which makes it difficult for a player with a relatively small hand to stretch an octave even with the fingers extended as much as possible. However, since many pieces of music require the hand to reach an octave or more, even an accomplished player can play a limited number of pieces if he/she cannot stretch an octave, and cannot fulfil his/her potential.

When the input device of one embodiment of the present invention displays a keyboard to be used as a keyboard instrument, a player can determine the position and size of the keys as he/she likes. This allows a player with a small hand to fulfil his/her potential to play the instrument. Furthermore, when the position and size of the keys are made different from those in commonly used keyboard instruments, musical performance normally impossible, such as pressing of all the C notes on the keyboard simultaneously, is made possible to play music more emotionally.

Figure 3A:
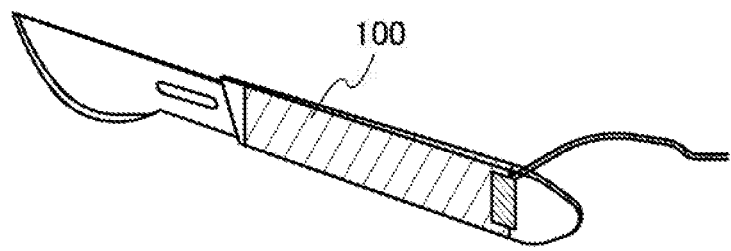
FIGS. 3A to 3C illustrate use examples of an input device.

The input device of one embodiment of the present invention can be wrapped around a handle of a scalpel. For example, the input device 100 of one embodiment of the present invention is attached to a scalpel as illustrated in FIG. 3A, and an acceleration sensor, a position sensor, and the like are also attached thereto. This allows information on the way of handling the scalpel (how the surgeon holds the scalpel, and its force, direction, speed, trajectory, and the like) to be collected in an external information management apparatus. The acquired information is analyzed to be used for the training of trainee doctors. Real-time operation of another surgical instrument based on the obtained information enables remote surgery. Furthermore, by monitoring the operation accuracy of the scalpel, the surgeon's fatigue can be detected to give a warning, preventing an accident.

Figure 3B:
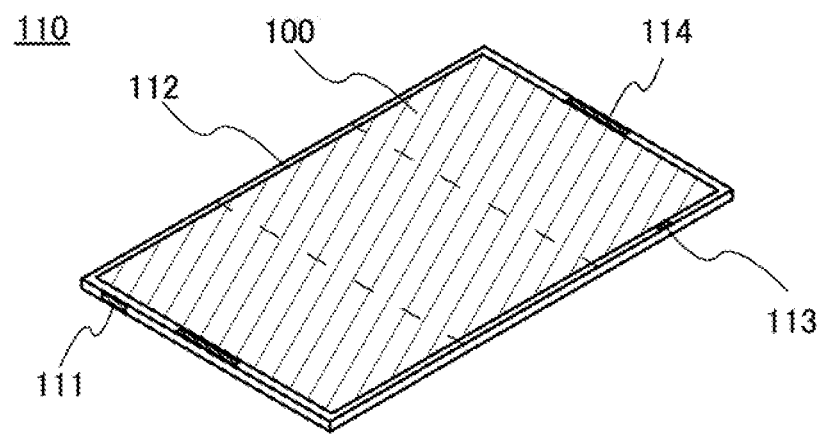

The input device of one embodiment of the present invention can also be used for a new-mode smart phone. For example, FIG. 3B illustrates an example of using the input device 100 of one embodiment of the present invention for a smart phone including a flexible housing. A smart phone 110 includes the input device 100, a housing 112 having flexibility, a power switch 111, a storage battery, a control circuit portion, an antenna, a microphone 113, a speaker 114, and the like.

Figure 3C:
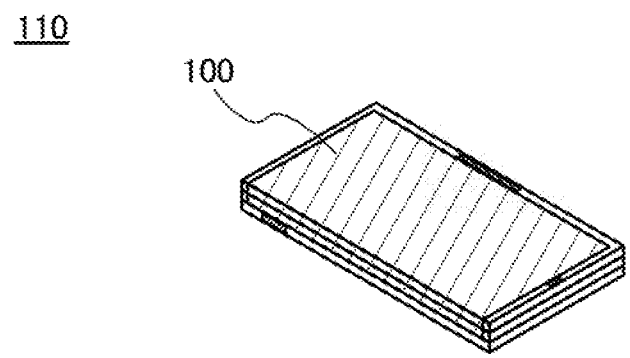

The shape of the smart phone 110 can be changed in accordance with the user's preference, usage purpose, or environment. For example, the smart phone 110 can be folded into a convenient size when used as a common cellular phone. FIG. 3C illustrates the shape of the smart phone 110 used as a cellular phone. Part of the input device constituting the display screen of the smart phone, which is folded and invisible from the outside, can be controlled not to display any image or not to receive any input for the sake of power saving and prevention of malfunction. In Internet use, the smart phone 110 can be developed as illustrated in FIG. 3B to be used as a tablet PC.

In the case where the input device of one embodiment of the present invention has a haptic function, for example, the input device can vibrate in incoming call to inform the user. The sense of touch of the input device may be partly changed in conversation to help the user's grasp.

<Structure of Touch Panel and Display Portion in Input Device 100>

In this embodiment, the display portion included in the input device 100 and a touch panel 2000 combined with the display portion will be described. The input device 100 including a touch sensor will also be described.

Figure 4A:
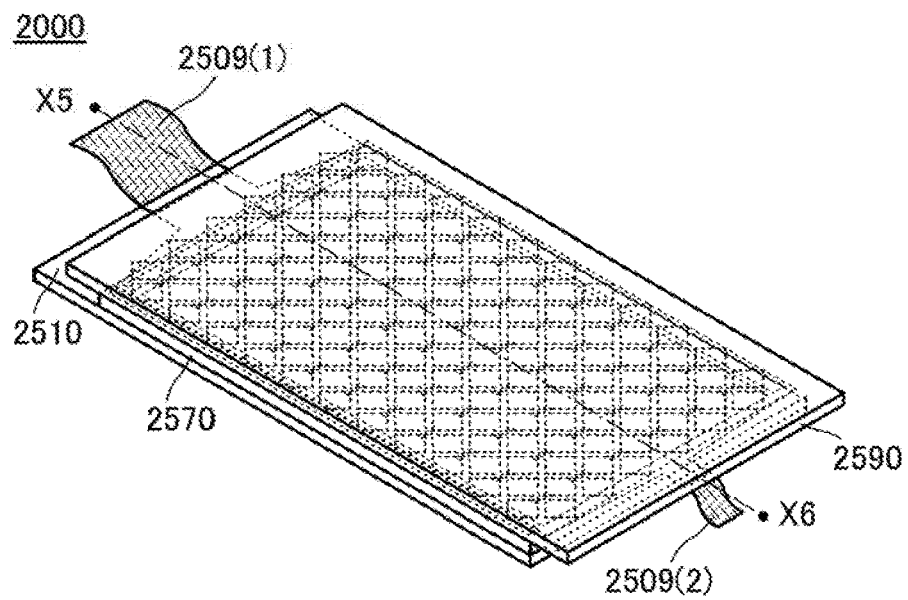
FIGS. 4A and 4B are perspective views illustrating an example of a touch panel of an input device.
Figure 4B:
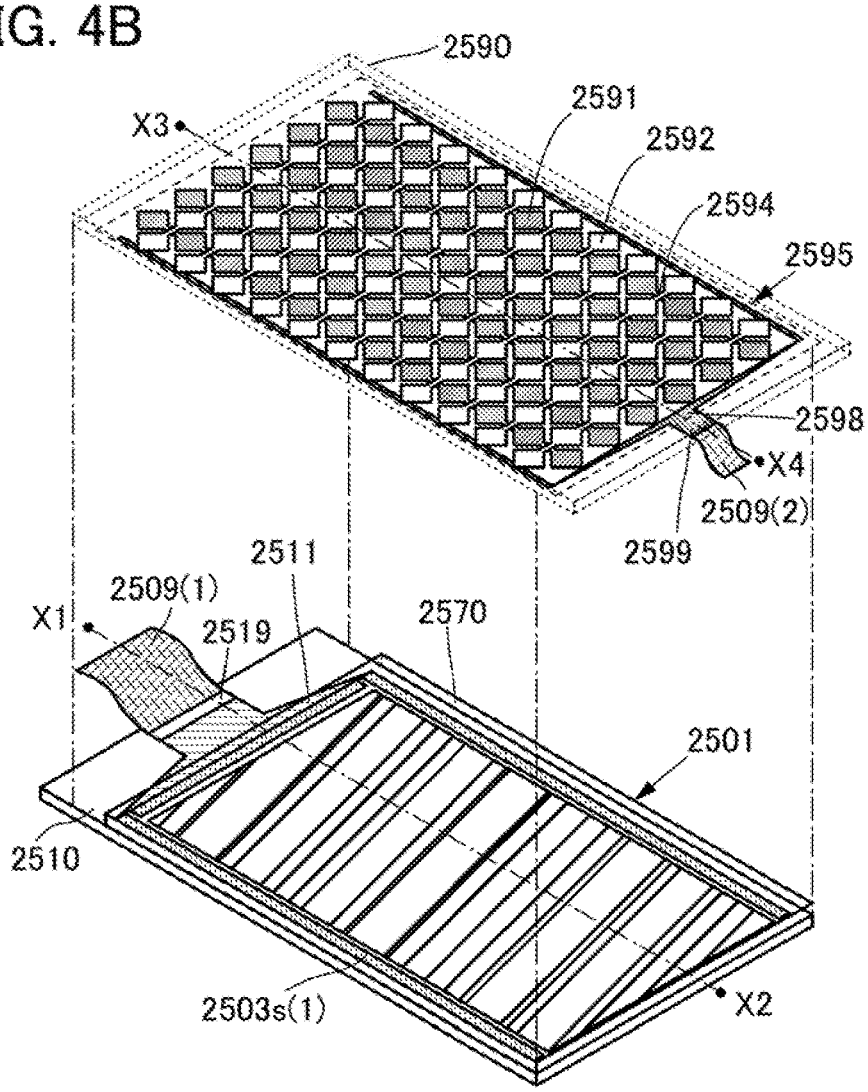

FIGS. 4A and 4B are perspective views of a touch panel 2000. Note that FIGS. 4A and 4B illustrate typical components of the touch panel 2000 for simplicity.

The touch panel 2000 includes a display portion 2501 and a touch sensor 2595 (see FIG. 4B). Furthermore, the touch panel 2000 includes substrates 2510, 2570, and 2590. Note that the substrates 2510, 2570, and 2590 each have flexibility. Note that one or all of the substrates 2510, 2570, and 2590 may be inflexible.

The display portion 2501 includes a plurality of pixels over the substrate 2510, and a plurality of wirings 2511 through which signals are supplied to the pixels. The plurality of wirings 2511 are led to a peripheral portion of the substrate 2510, and part of the plurality of wirings 2511 forms a terminal 2519. The terminal 2519 is electrically connected to an FPC 2509(1). Signals from a signal line driver circuit 2503$s$(1) can be supplied to the plurality of pixels through the plurality of wirings 2511.

The substrate 2590 includes the touch sensor 2595 and a plurality of wirings 2598 electrically connected to the touch sensor 2595. The plurality of wirings 2598 are led to a peripheral portion of the substrate 2590, and part of the plurality of wirings 2598 forms a terminal. The terminal is electrically connected to an FPC 2509(2). Note that in FIG. 4B, electrodes, wirings, and the like of the touch sensor 2595 provided on the back side of the substrate 2590 (the side facing the substrate 2510) are indicated by solid lines for clarity.

As the touch sensor 2595, for example, a capacitive touch sensor can be used. Examples of the capacitive touch sensor include a surface capacitive touch sensor and a projected capacitive touch sensor.

Examples of the projected capacitive touch sensor include a self-capacitive touch sensor and a mutual capacitive touch sensor, which differ mainly in the driving method. The use of the mutual capacitive type is preferable because multiple points can be sensed simultaneously.

Note that the touch sensor 2595 illustrated in FIG. 4B is an example of using a projected capacitive touch sensor.

Note that a variety of sensors that can sense the proximity or touch of a sensing target such as a finger can be used as the touch sensor 2595.

The projected capacitive touch sensor 2595 includes electrodes 2591 and electrodes 2592. The electrodes 2591 are electrically connected to any of the plurality of wirings 2598, and the electrodes 2592 are electrically connected to any of the other wirings 2598.

The electrodes 2592 each have a shape of a plurality of quadrangles arranged in one direction with one corner of a quadrangle connected to one corner of another quadrangle as illustrated in FIGS. 4A and 4B.

The electrodes 2591 each have a quadrangular shape and are arranged in a direction intersecting with the direction in which the electrodes 2592 extend.

A wiring 2594 electrically connects two electrodes 2591 between which the electrode 2592 is positioned. The intersecting area of the electrode 2592 and the wiring 2594 is preferably as small as possible. Such a structure allows a reduction in the area of a region where the electrodes are not provided, reducing variation in transmittance. As a result, variation in the luminance of light passing through the touch sensor 2595 can be reduced.

Note that the shapes of the electrodes 2591 and the electrodes 2592 are not limited thereto and can be any of a variety of shapes. For example, a structure may be employed in which the plurality of electrodes 2591 are arranged so that gaps between the electrodes 2591 are reduced as much as possible, and the electrodes 2592 are spaced apart from the electrodes 2591 with an insulating layer interposed therebetween to have regions not overlapping with the electrodes 2591. In this case, it is preferable to provide, between two adjacent electrodes 2592, a dummy electrode electrically insulated from these electrodes because the area of regions having different transmittances can be reduced.

<Description on Display Portion>

Figure 5A:
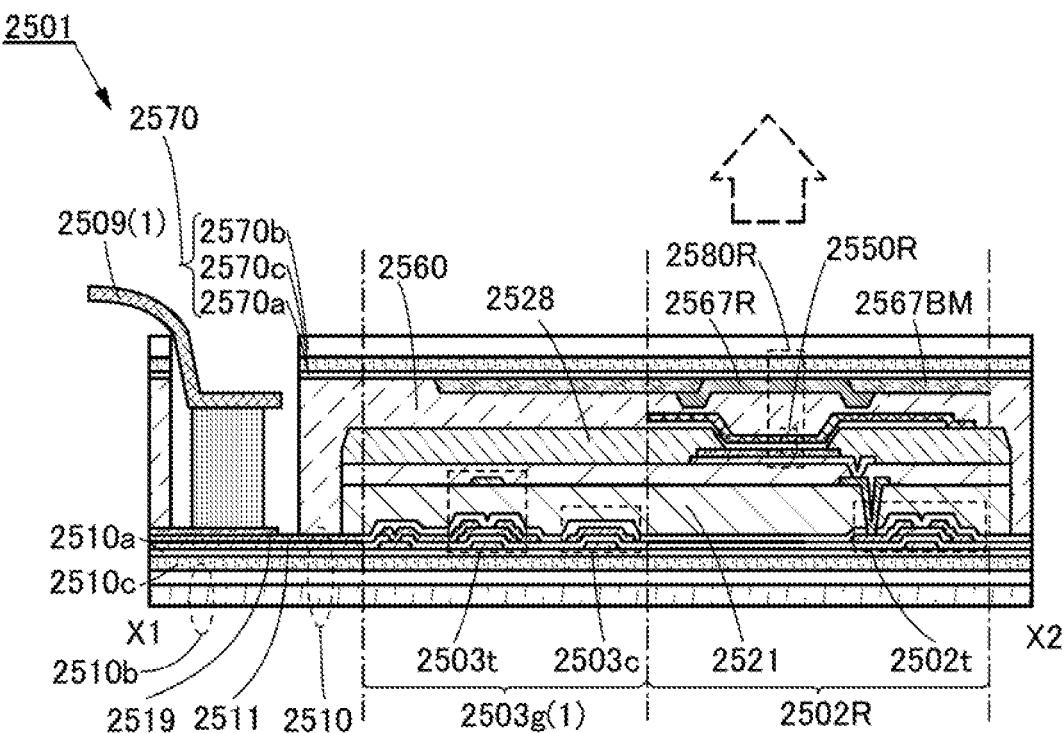
FIGS. 5A to 5C are cross-sectional views illustrating examples of a display element and a touch sensor of an input device.

Next, the display portion 2501 will be described in detail with reference to FIG. 5A. FIG. 5A is a cross-sectional view along dashed-dotted line X1-X2 in FIG. 4B.

The display portion 2501 includes a plurality of pixels arranged in a matrix. Each of the pixels includes a display element and a pixel circuit for driving the display element.

An example of using a light-emitting element that emits white light as a display element will be described below; however, the display element is not limited thereto. For example, light-emitting elements that emit light of different colors may be included so that the light of different colors can be emitted from adjacent pixels. A liquid crystal display (LCD) panel as well as the light-emitting element may be used in the display portion. Note that the LCD panel requires a back light unit as a light source to increase the thickness of the display portion; hence, the light-emitting element typified by an organic light-emitting diode (OLED) panel is preferably used. The flexible display portion with a smaller thickness is less likely to suffer from damage due to deformation. Thus, the flexible display portion using the OLED panel has high durability.

For the substrate 2510 and the substrate 2570, for example, a flexible material with a vapor permeability lower than or equal to $1\times10^{-5}$ g·m$^{-2}$·day$^{-1}$, preferably lower than or equal to $1\times10^{-6}$ g·m$^{-2}$·day$^{-1}$ can be favorably used. Note that materials for the substrate 2510 and the substrate 2570 preferably have substantially the same thermal expansion coefficient. For example, the coefficient of linear expansion of the materials are preferably lower than or equal to $1\times10^{-3}$/K, further preferably lower than or equal to $5\times10^{-5}$/K, and still further preferably lower than or equal to $1\times10^{-5}$/K.

Note that the substrate 2510 is a stacked body including an insulating layer 2510a for preventing impurity diffusion into the light-emitting element, a flexible substrate 2510b, and an adhesive layer 2510c for attaching the insulating layer 2510a and the flexible substrate 2510b to each other. The substrate 2570 is a stacked body including an insulating layer 2570a for preventing impurity diffusion into the light-emitting element, a flexible substrate 2570b, and an adhesive layer 2570c for attaching the insulating layer 2570a and the flexible substrate 2570b to each other.

For the adhesive layer 2510c and the adhesive layer 2570c, for example, polyester, polyolefin, polyamide (e.g., nylon, aramid), polyimide, polycarbonate, or an acrylic resin, polyurethane, or an epoxy resin can be used. Alternatively, a material that includes a resin having a siloxane bond such as silicone can be used.

A sealing layer 2560 is provided between the substrate 2510 and the substrate 2570. The sealing layer 2560 preferably has a refractive index higher than that of air. In the case where light is extracted to the sealing layer 2560 side as illustrated in FIG. 5A, the sealing layer 2560 can also serve as an optical adhesive layer.

A sealant may be formed in the peripheral portion of the sealing layer 2560. With the use of the sealant, a light-emitting element 2550R can be provided in a region surrounded by the substrate 2510, the substrate 2570, the sealing layer 2560, and the sealant. Note that an inert gas (such as nitrogen or argon) may be used instead of the sealing layer 2560. A drying agent may be provided in the inert gas so as to adsorb moisture or the like. A resin such as an acrylic resin or an epoxy resin may also be used. An epoxy-based resin or a glass frit is preferably used as the sealant. As a material used for the sealant, a material which is impermeable to moisture and oxygen is preferably used.

The display portion 2501 includes a pixel 2502R. The pixel 2502R includes a light-emitting module 2580R.

The pixel 2502R includes the light-emitting element 2550R and a transistor 2502t that can supply electric power to the light-emitting element 2550R. Note that the transistor 2502t functions as part of the pixel circuit. The light-emitting module 2580R includes the light-emitting element 2550R and a coloring layer 2567R.

The light-emitting element 2550R includes a lower electrode, an upper electrode, and an EL layer between the lower electrode and the upper electrode.

A microcavity structure may be employed between the lower electrode and the upper electrode so as to increase the intensity of light having a specific wavelength.

In the case where the sealing layer 2560 is provided on the light extraction side, the sealing layer 2560 is in contact with the light-emitting element 2550R and the coloring layer 2567R.

The coloring layer 2567R is positioned in a region overlapping with the light-emitting element 2550R. Accordingly, part of light emitted from the light-emitting element 2550R passes through the coloring layer 2567R and is emitted to the outside of the light-emitting module 2580R as indicated by an arrow in FIG. 5A.

The display portion 2501 includes a light-blocking layer 2567BM on the light extraction side. The light-blocking layer 2567BM is provided so as to surround the coloring layer 2567R.

The coloring layer 2567R is a coloring layer having a function of transmitting light in a particular wavelength region. For example, a color filter for transmitting light in a red wavelength region, a color filter for transmitting light in a green wavelength region, a color filter for transmitting light in a blue wavelength region, a color filter for transmitting light in a yellow wavelength region, or the like can be used. Each color filter can be formed with any of various materials by a printing method, an inkjet method, an etching method using a photolithography technique, or the like.

An insulating layer 2521 is provided in the display portion 2501. The insulating layer 2521 covers the transistor 2502t. Note that the insulating layer 2521 has a function of covering unevenness caused by the pixel circuit. The insulating layer 2521 may have a function of suppressing impurity diffusion. This can prevent the reliability of the transistor 2502t or the like from being lowered by impurity diffusion.

The light-emitting element 2550R is formed over the insulating layer 2521. A partition wall 2528 is provided so as to overlap with an end portion of the lower electrode of the light-emitting element 2550R. Note that a spacer for controlling the distance between the substrate 2510 and the substrate 2570 may be formed over the partition wall 2528.

A scan line driver circuit 2503g(1) includes a transistor 2503t and a capacitor 2503c. Note that the driver circuit and the pixel circuits can be formed over the same substrate in the same process.

The wirings 2511 through which signals can be supplied are provided over the substrate 2510. The terminal 2519 is provided over the wirings 2511. The FPC 2509(1) is electrically connected to the terminal 2519. The FPC 2509(1) has a function of supplying a video signal, a clock signal, a start signal, a reset signal, or the like. Note that the FPC 2509(1) may be provided with a printed wiring board (PWB).

Figure 5B:
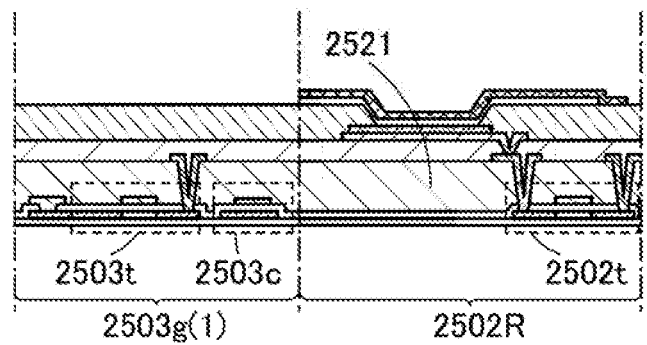

In the display portion 2501, transistors with any of a variety of structures can be used. FIG. 5A illustrates an example of using bottom-gate transistors; however, the present invention is not limited to this example, and top-gate transistors may be used in the display portion 2501 as illustrated in FIG. 5B.

In addition, there is no particular limitation on the polarity of the transistor 2502t and the transistor 2503t. For these transistors, n-channel and p-channel transistors may be used, or either n-channel transistors or p-channel transistors may be used, for example. Furthermore, there is no particular limitation on the crystallinity of a semiconductor film used for the transistors 2502t and 2503t. For example, an amorphous semiconductor film or a crystalline semiconductor film may be used. Examples of semiconductor materials include Group 13 semiconductors (e.g., a semiconductor including gallium), Group 14 semiconductors (e.g., a semiconductor including silicon), compound semiconductors (including oxide semiconductors), and organic semiconductors. An oxide semiconductor that has an energy gap of 2 eV or more, preferably 2.5 eV or more, further preferably 3 eV or more is preferably used for one of the transistors 2502t and 2503t or both, so that the off-state current of the transistors can be reduced. Examples of the oxide semiconductors include an In—Ga oxide and an In-M-Zn oxide (M represents Al, Ga, Y, Zr, La, Ce, Sn, Hf, or Nd).

<Description on Touch Sensor>

Figure 5C:
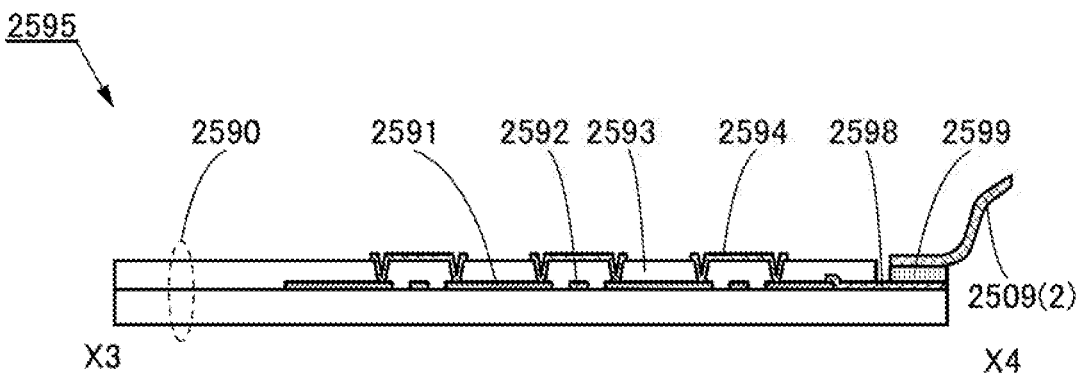

Next, the touch sensor 2595 will be described in detail with reference to FIG. 5C. FIG. 5C corresponds to a cross-sectional view taken along dashed-dotted line X3-X4 in FIG. 4B.

The touch sensor 2595 includes the electrodes 2591 and the electrodes 2592 provided in a staggered arrangement on the substrate 2590, an insulating layer 2593 covering the electrodes 2591 and the electrodes 2592, and the wiring 2594 that electrically connects the adjacent electrodes 2591 to each other.

The electrodes 2591 and the electrodes 2592 are formed using a light-transmitting conductive material. As a light-transmitting conductive material, a conductive oxide such as indium oxide, indium tin oxide, indium zinc oxide, zinc oxide, or zinc oxide to which gallium is added can be used. Note that a film including graphene may be used as well. The film including graphene can be formed, for example, by reducing a film containing graphene oxide. As a reducing method, a method with application of heat or the like can be employed.

The electrodes 2591 and the electrodes 2592 may be formed by, for example, depositing a light-transmitting conductive material on the substrate 2590 by a sputtering method and then removing an unnecessary portion by any of various pattern forming techniques such as photolithography.

Examples of a material for the insulating layer 2593 are a resin such as an acrylic resin or an epoxy resin, a resin having a siloxane bond such as silicone, and an inorganic insulating material such as silicon oxide, silicon oxynitride, or aluminum oxide.

Openings reaching the electrodes 2591 are formed in the insulating layer 2593, and the wiring 2594 electrically connects the adjacent electrodes 2591. A light-transmitting conductive material can be favorably used as the wiring 2594 because the aperture ratio of the touch panel can be increased. Moreover, a material having higher conductivity than the electrodes 2591 and 2592 can be favorably used for the wiring 2594 because electric resistance can be reduced.

One electrode 2592 extends in one direction, and a plurality of electrodes 2592 are provided in the form of stripes. The wiring 2594 intersects with the electrode 2592.

One electrode 2592 is provided between the pair of electrodes 2591. The wiring 2594 electrically connects the pair of electrodes 2591.

Note that the plurality of electrodes 2591 are not necessarily arranged in the direction orthogonal to one electrode 2592 and may be arranged to intersect with one electrode 2592 at an angle of more than 0 degrees and less than 90 degrees.

The wiring 2598 is electrically connected to any of the electrodes 2591 and 2592. Part of the wiring 2598 functions as a terminal. For the wiring 2598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 2593 and the wiring 2594 may be provided to protect the touch sensor 2595.

A connection layer 2599 electrically connects the wiring 2598 to the FPC 2509(2).

As the connection layer 2599, any of various anisotropic conductive films (ACF), anisotropic conductive pastes (ACP), or the like can be used.

<Description on Touch Panel 2>

Figure 6A:
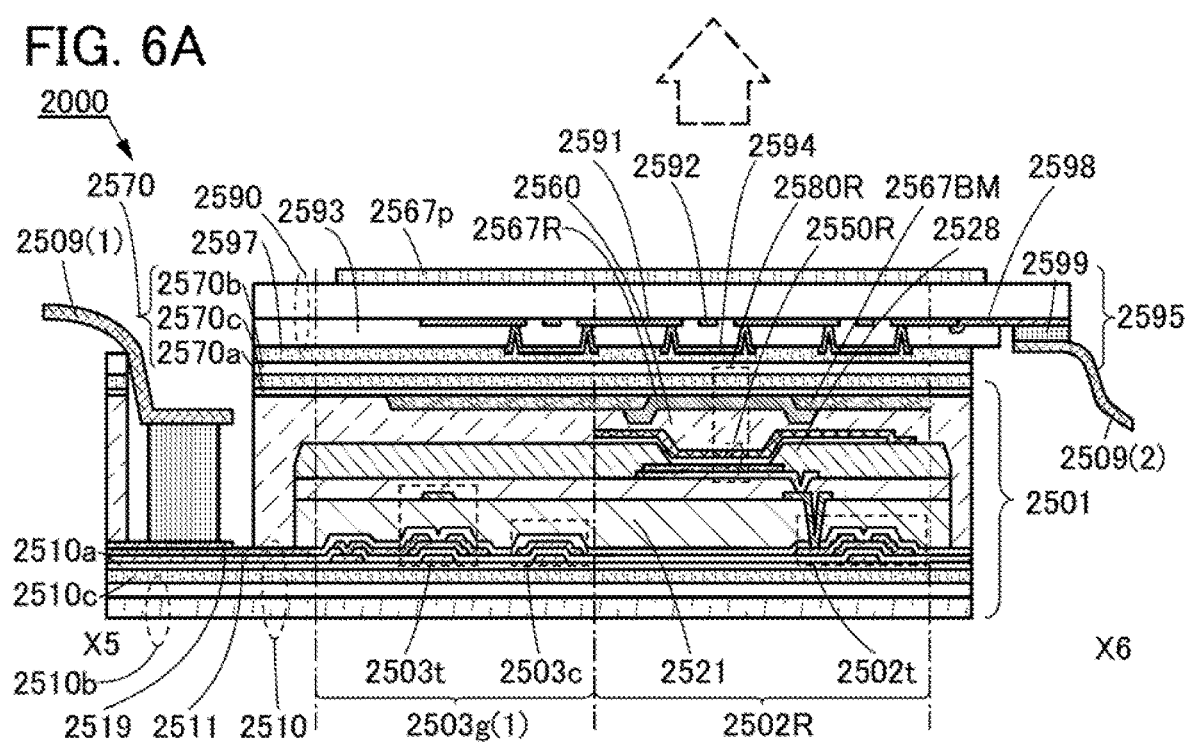
FIGS. 6A and 6B are cross-sectional views each illustrating an example of a touch panel of an input device.

Next, the touch panel 2000 will be described in detail with reference to FIG. 6A. FIG. 6A corresponds to a cross-sectional view taken along dashed-dotted line X5-X6 in FIG. 4A.

In the touch panel 2000 illustrated in FIG. 6A, the display portion 2501 described with reference to FIG. 5A and the touch sensor 2595 described with reference to FIG. 5C are attached to each other.

The touch panel 2000 illustrated in FIG. 6A includes an adhesive layer 2597 and an anti-reflective layer 2567p in addition to the components described with reference to FIGS. 5A and 5C.

The adhesive layer 2597 is provided in contact with the wiring 2594. Note that the adhesive layer 2597 attaches the substrate 2590 to the substrate 2570 so that the touch sensor 2595 overlaps with the display portion 2501. The adhesive layer 2597 preferably has a light-transmitting property. A heat curable resin or an ultraviolet curable resin can be used for the adhesive layer 2597. For example, an acrylic resin, a urethane-based resin, an epoxy-based resin, or a siloxane-based resin can be used.

The anti-reflective layer 2567*p* is positioned in a region overlapping with pixels. As the anti-reflective layer 2567*p*, a circularly polarizing plate can be used, for example.

Next, a touch panel having a structure different from that illustrated in FIG. 6A will be described with reference to FIG. 6B.

Figure 6B:
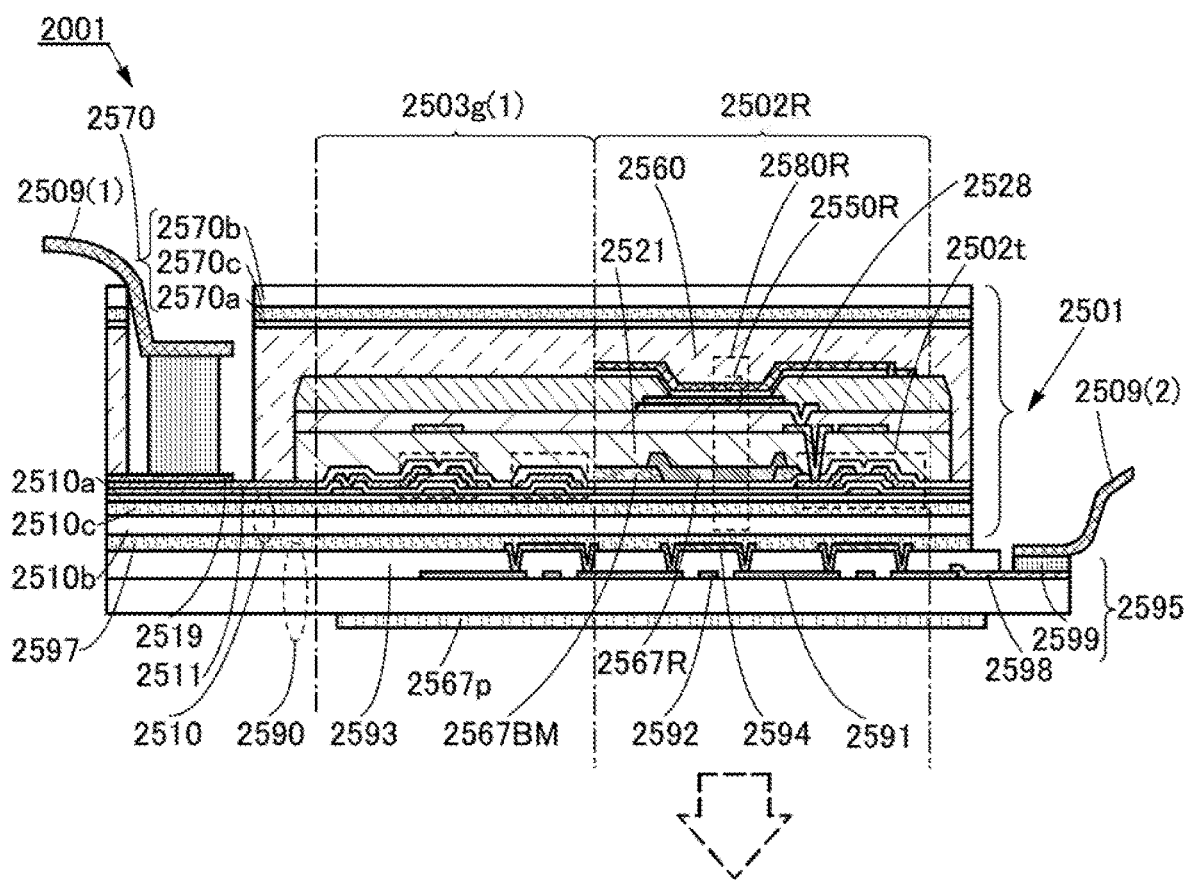

FIG. 6B is a cross-sectional view of a touch panel 2001. The touch panel 2001 illustrated in FIG. 6B differs from the touch panel 2000 illustrated in FIG. 6A in the position of the touch sensor 2595 relative to the display portion 2501. Different parts are described in detail below, and the above description of the touch panel 2000 is referred to for the other similar parts.

The coloring layer 2567R is positioned in a region overlapping with the light-emitting element 2550R. The light-emitting element 2550R illustrated in FIG. 6B emits light to the side where the transistor 2502*t* is provided. Accordingly, part of light emitted from the light-emitting element 2550R passes through the coloring layer 2567R and is emitted to the outside of the light-emitting module 2580R as indicated by an arrow in FIG. 6B.

The touch sensor 2595 is provided on the substrate 2510 side of the display portion 2501.

The adhesive layer 2597 is provided between the substrate 2510 and the substrate 2590 and attaches the touch sensor 2595 to the display portion 2501.

As illustrated in FIG. 6A or 6B, light may be emitted from the light-emitting element through one or both of the substrate 2510 and the substrate 2570.

<Description on Method for Driving Touch Panel>

Next, an example of a method for driving a touch panel will be described with reference to FIGS. 7A and 7B.

Figure 7A:
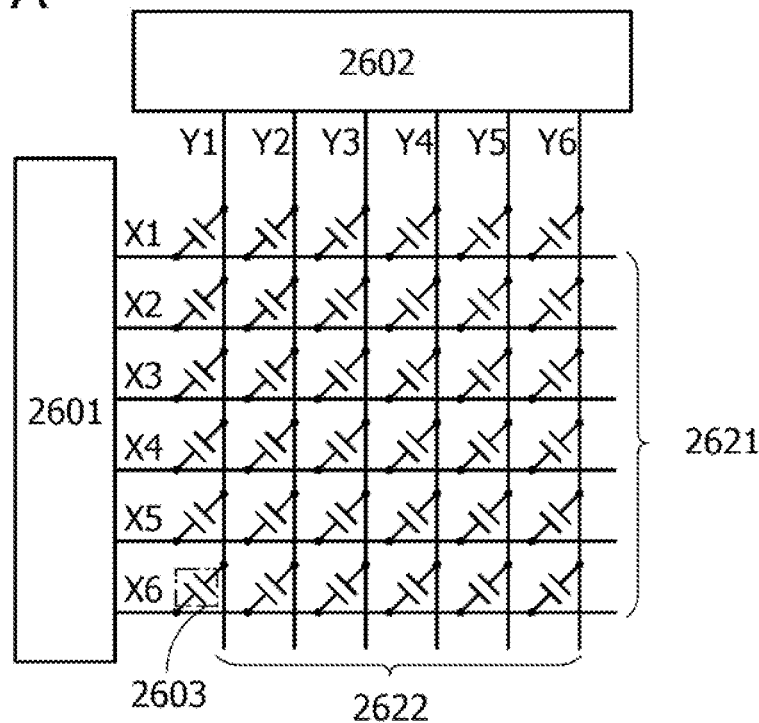
FIGS. 7A and 7B are a block diagram and a timing chart of a touch sensor of an input device.

FIG. 7A is a block diagram illustrating the structure of a mutual capacitive touch sensor. FIG. 7A illustrates a pulse voltage output circuit 2601 and a current sensing circuit 2602. Note that in FIG. 7A, six wirings X1 to X6 represent the electrodes 2621 to which a pulse voltage is applied, and six wirings Y1 to Y6 represent the electrodes 2622 that detect changes in current. FIG. 7A also illustrates capacitors 2603 that are each formed in a region where the electrodes 2621 and 2622 overlap with each other. Note that functional replacement between the electrodes 2621 and 2622 is possible.

The pulse voltage output circuit 2601 is a circuit for sequentially applying a pulse voltage to the wirings X1 to X6. By application of a pulse voltage to the wirings X1 to X6, an electric field is generated between the electrodes 2621 and 2622 of the capacitor 2603. When the electric field between the electrodes is shielded, for example, a change occurs in the capacitor 2603 (mutual capacitance). The approach or contact of a sensing target can be sensed by utilizing this change.

The current sensing circuit 2602 is a circuit for detecting changes in current flowing through the wirings Y1 to Y6 that are caused by the change in mutual capacitance in the capacitor 2603. No change in current value is sensed in the wirings Y1 to Y6 when there is no approach or contact of a sensing target, whereas a decrease in current value is sensed when mutual capacitance decreases due to the approach or contact of a sensing target. Note that an integrator circuit or the like is used for sensing of current.

Figure 7B:
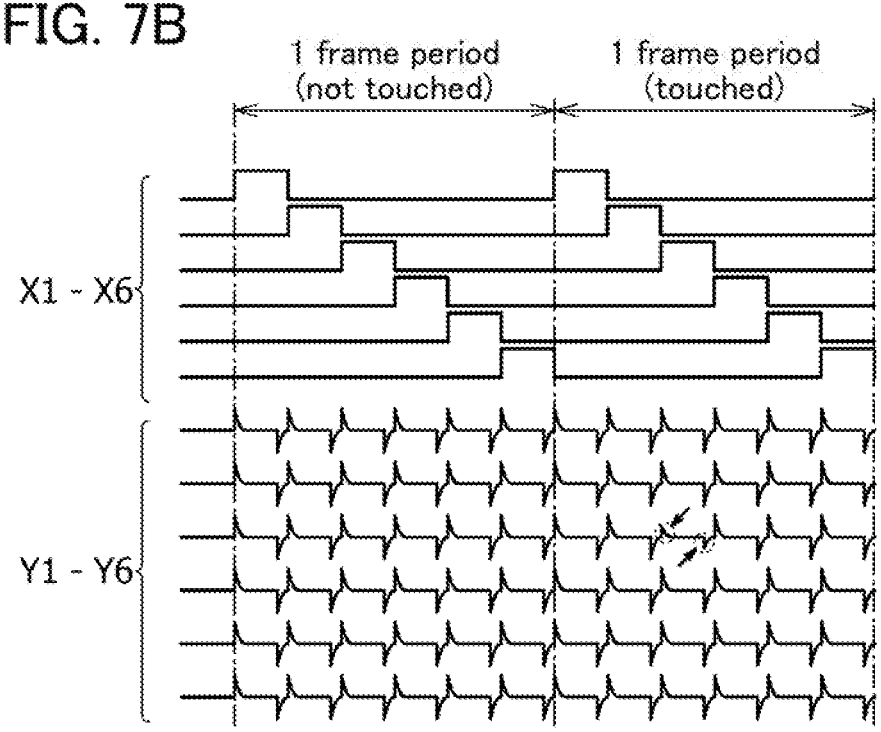

FIG. 7B is a timing chart showing input and output waveforms in the mutual capacitive touch sensor illustrated in FIG. 7A. In FIG. 7B, a sensing target is sensed in all the rows and columns in one frame period. FIG. 7B shows a period when a sensing target is not sensed (not touched) and a period when a sensing target is sensed (touched). Sensed current values of the wirings Y1 to Y6 are shown as the waveforms of voltage values.

Pulse voltages are sequentially applied to the wirings X1 to X6, and the waveforms of the wirings Y1 to Y6 change in accordance with the pulse voltages. When there is no approach or contact of a sensing target, the waveforms of the wirings Y1 to Y6 change uniformly in accordance with changes in the voltages of the wirings X1 to X6. The current value decreases at the point of approach or contact of a sensing target and accordingly the waveform of the voltage value changes.

By sensing a change in mutual capacitance in this manner, the approach or contact of a sensing target can be sensed.

<Description on Sensor Circuit>

Figure 8:
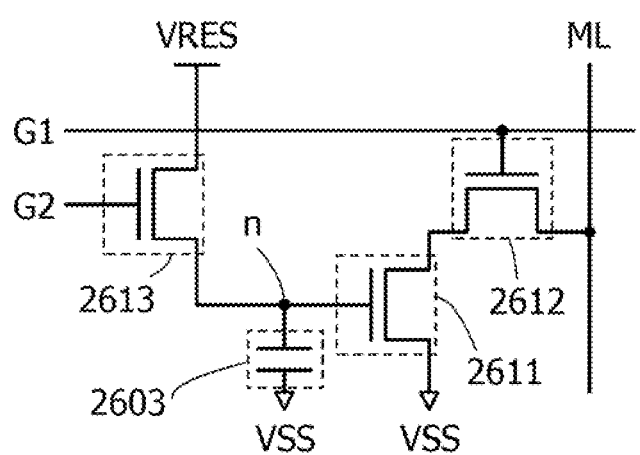
FIG. 8 is a circuit diagram of a touch sensor of an input device.

The passive matrix type touch sensor in which only the capacitor 2603 is provided at the intersection of wirings is illustrated as a touch sensor in FIG. 7A; alternatively, an active matrix type touch sensor including a transistor and a capacitor may be used. FIG. 8 illustrates an example of a sensor circuit included in an active matrix type touch sensor.

The sensor circuit in FIG. 8 includes the capacitor 2603 and transistors 2611, 2612, and 2613.

A signal G2 is input to a gate of the transistor 2613. A voltage VRES is applied to one of a source and a drain of the transistor 2613, and one electrode of the capacitor 2603 and a gate of the transistor 2611 are electrically connected to the other of the source and the drain of the transistor 2613. One of a source and a drain of the transistor 2611 is electrically connected to one of a source and a drain of the transistor 2612, and a voltage VSS is applied to the other of the source and the drain of the transistor 2611. A signal G1 is input to a gate of the transistor 2612, and a wiring ML is electrically connected to the other of the source and the drain of the transistor 2612. The voltage VSS is applied to the other electrode of the capacitor 2603.

Next, the operation of the sensor circuit in FIG. 8 will be described. First, a potential for turning on the transistor 2613 is supplied as the signal G2, and a potential corresponding to the voltage VRES is thus applied to a node n connected to the gate of the transistor 2611. Then, a potential for turning off the transistor 2613 is applied as the signal G2, whereby the potential of the node n is maintained.

Then, mutual capacitance of the capacitor 2603 changes owing to the approach or contact of a sensing target such as a finger, and accordingly the potential of the node n is changed from VRES.

In reading operation, a potential for turning on the transistor 2612 is supplied as the signal G1. A current flowing through the transistor 2611, that is, a current flowing through the wiring ML changes with the potential of the node n. By sensing this current, the approach or contact of a sensing target can be sensed.

In each of the transistors 2611, 2612, and 2613, an oxide semiconductor layer is preferably used as a semiconductor layer in which a channel region is formed. In particular, such a transistor is preferably used as the transistor 2613 so that the potential of the node n can be held for a long time and the frequency of operation of resupplying VRES to the node n (refresh operation) can be reduced.

<Description on Haptic Controller>

Described is a haptic controller used with the input device of one embodiment of the present invention. Note that in the input device of one embodiment of the present invention, the function of the haptic controller may be achieved as a function of another element, or the haptic controller is not necessarily used.

The haptic controller is configured to manage haptic input information sensed by the input device, and transmit the information after converting it into a mode capable of being read by an apparatus connected to the input device. The haptic controller is also configured to control information supplied to a user of the input device by the sense of touch and transmit the controlled information to a haptic actuator configured to express tactile information. That is, the haptic controller is configured to control input and output of tactile information.

<Description on Driving Method of Vibrator>

Figure 9A:
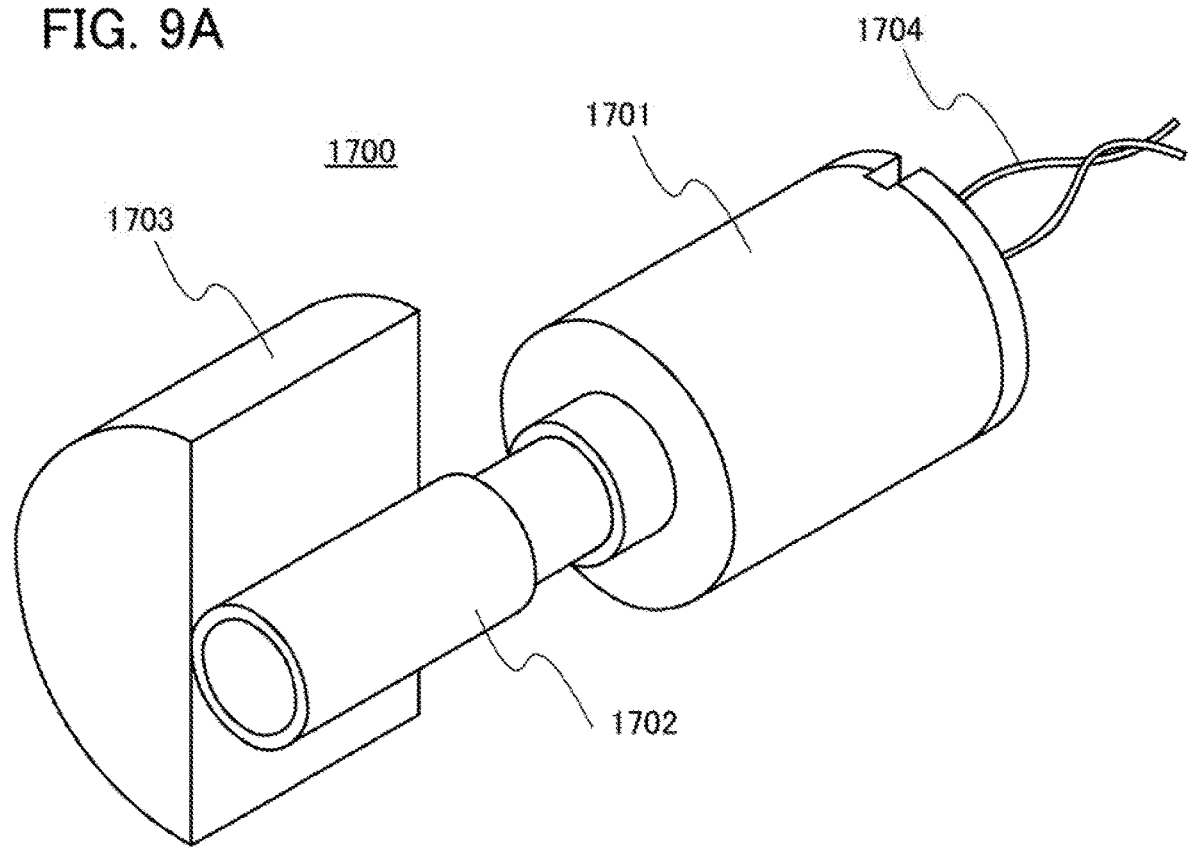
FIGS. 9A and 9B illustrate a haptic actuator.
Figure 9B:
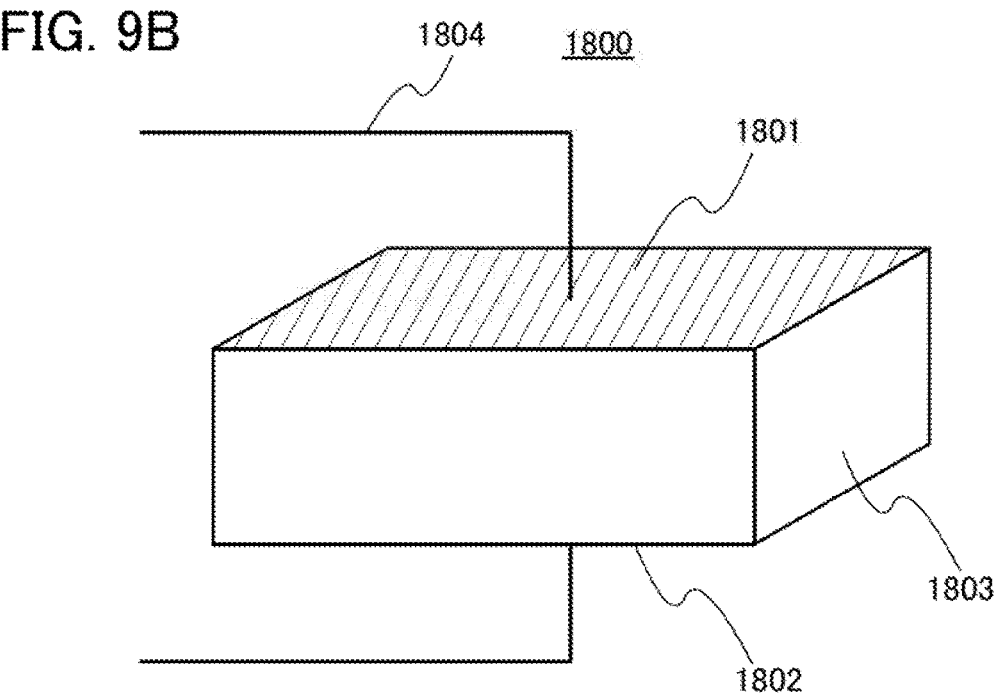

Next, a vibrator serving as a haptic actuator will be described with reference to FIGS. 9A and 9B. The input device of one embodiment of the present invention has flexibility; therefore, even when the input device is partly attached with a vibrator to vibrate, vibration is unlikely to be transmitted throughout the input device. In other words, vibration can be locally caused in a necessary portion while being suppressed in the other portion. Thus, a haptic effect can be controlled more precisely with a plurality of vibrators.

There are a variety of vibrators such as an eccentric rotating mass (ERM) motor, a linear resonant actuator (LRA), and a piezoelectric vibrator.

First, the ERM motor is described. FIG. 9A illustrates an ERM motor 1700 including a motor portion 1701, an axis 1702, an eccentric weight 1703, and a wiring 1704. When a DC current flows through the wiring 1704, the axis 1702 connected to the motor portion 1701 rotates to rotate the eccentric weight 1703. Here, the eccentric weight 1703 weighs much in the overall ERM motor 1700; thus, the center of gravity of the ERM motor 1700 circulates with the axis 1702 rotating. This circular motion of the center of gravity causes vibration.

To increase vibration intensity, the amount of current supplied from the wiring 1704 is adjusted to increase the number of revolutions of the motor. A current flowing intermittently produces an intermittent vibration. That is, the ERM motor 1700 has a full control of the vibration.

Next, a piezoelectric element is described. Note that the piezoelectric vibrator is also called the piezoelectric actuator. FIG. 9B illustrates the simplest model of a piezoelectric vibrator. A piezoelectric element 1800 is modeled as a capacitor including an electrode 1801, and electrode 1802, and a dielectric 1803.

In general capacitors, the distance between electrodes is constant and the capacitance is also constant according to Coulomb's law. However, in the piezoelectric element 1800, a voltage applied through the wiring 1804 generates electric field to change the distance between the electrodes, thereby changing the capacitance. With the distance between the electrodes applied with no voltage as an initial value, the distance changes in proportion to the electric field, which is determined by the voltage applied between the electrodes and the distance therebetween. Accordingly, the two electrodes can vibrate with a voltage applied continuously to the piezoelectric element 1800. The vibration is transmitted to a device in contact with the piezoelectric element 1800, so that the piezoelectric element 1800 can serve as a vibrator.

Note that the capacitance of the piezoelectric element 1800 changes when the distance between the electrodes changes due to external vibration. Hence, by monitoring a change in capacitance, the piezoelectric element 1800 can also serve as a vibration sensor.

<Description on Positioning of Button 1>

Figure 10:
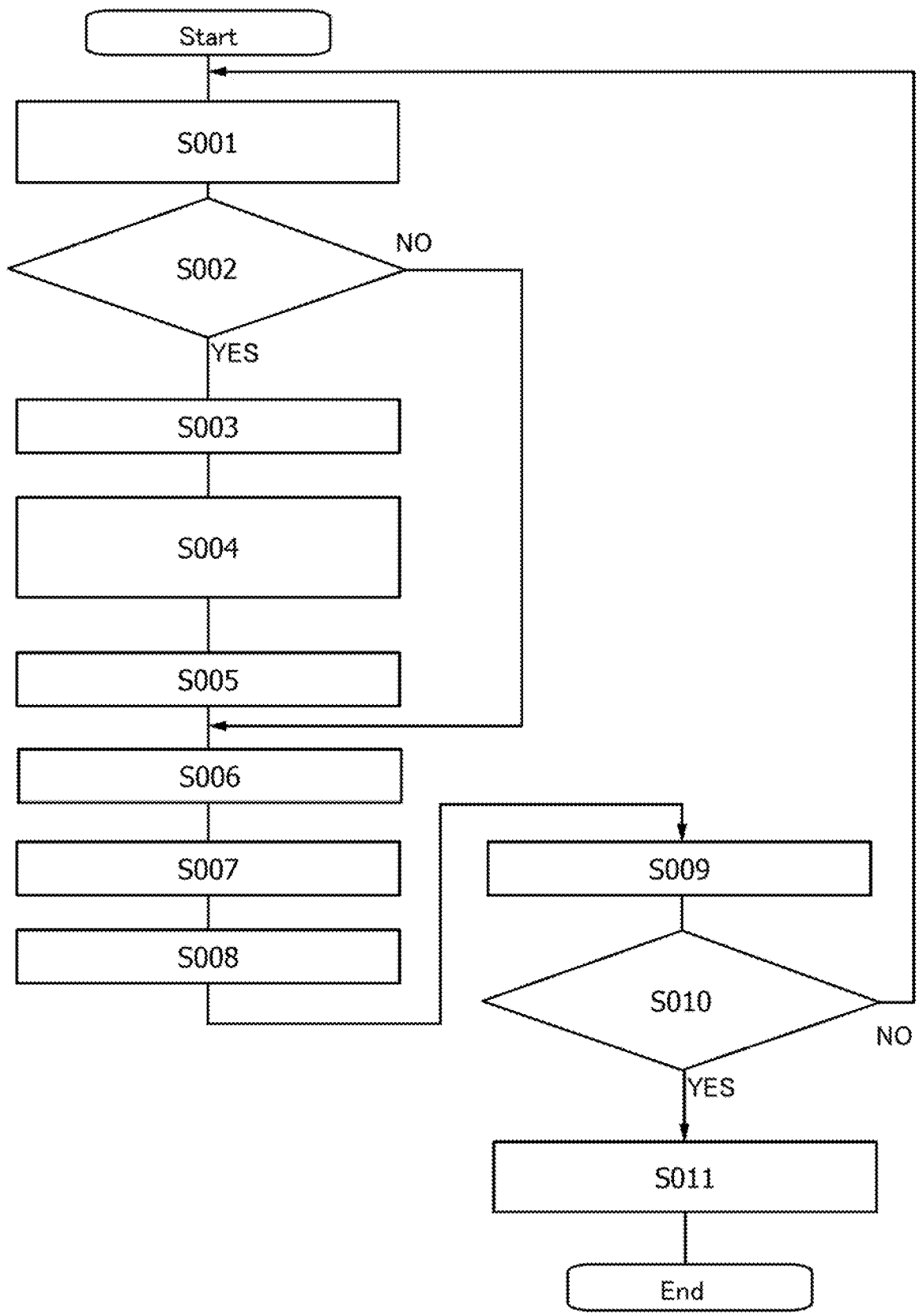
FIG. 10 is a flowchart showing the selection and determination of the positioning of buttons.

In the input device of one embodiment of the present invention, the position of an input button can be selected and determined by a user. A flow example of selection and determination of positioning of an input button will be described with reference to FIG. 10.

In the input device of one embodiment of the present invention, typical kinds of button positioning may be preset in a memory portion. This facilitates a user to determine the position of a button and quickly change the position in switching usage. In a first step of determining the position and the like of an input button, a preset selection screen with regard to the position of the input button is displayed on a display portion of the input device (S001). A user determines whether his/her preferred positioning of the input button is preset or not (S002). If the user finds a preferred preset, he/she selects the preset (S003) and proceeds to determine the details. In contrast, if the user does not find a preset positioning of buttons or the like, the position of each button or the like can be customized to be determined (S006).

After the user finds the preferred preset, the display portion displays a screen for selecting and determining the overall positioning of the selected preset buttons in accordance with the hand size, usage, or the like of the user (S004). A feature of the input device of one embodiment of the present invention is that the position of a button can be changed almost continuously in accordance with the user's preference or physique. In selecting the positioning, the numerical size of a hand or the like may be input with use of a touch panel of the input device or the user may place the hand on the touch panel so that the input device recognizes the hand size and automatically determines the positioning.

Figure 11A:
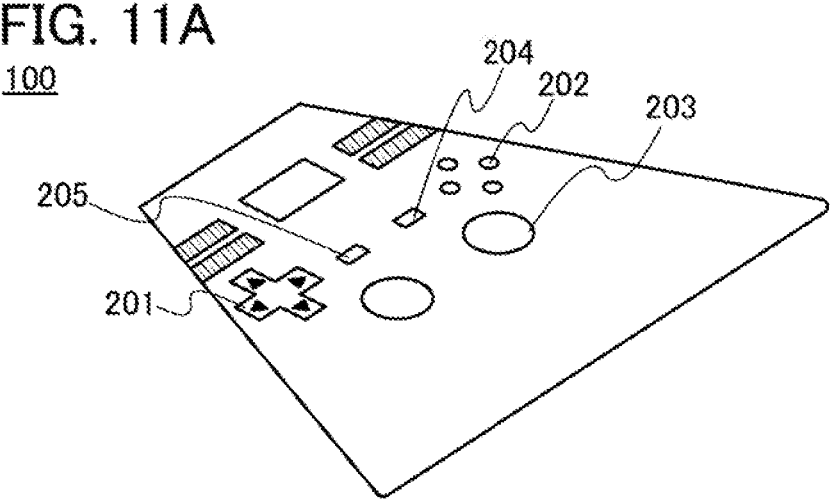
FIGS. 11A to 11C each illustrate an example of the positioning of buttons in an input device.
Figure 11B:
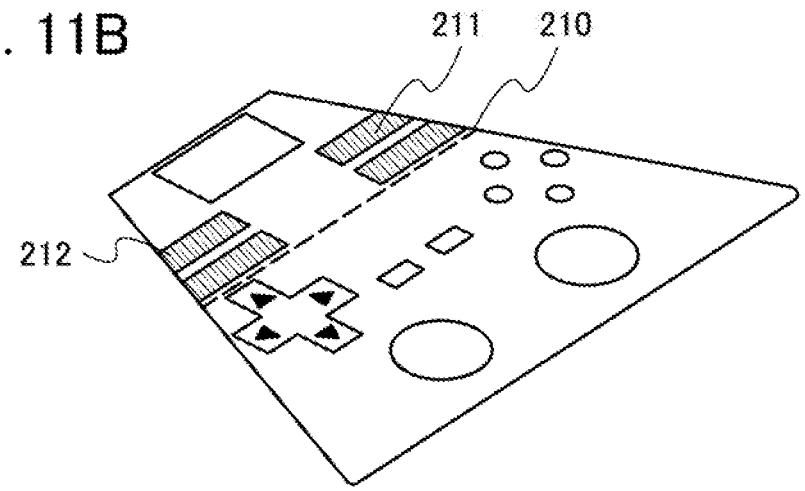

FIGS. 11A and 11B show examples in which the same preset buttons are provided entirely in different positions. FIGS. 11A and 11B show examples of button positioning for a user with a relatively small hand size and for a user with a relatively large hand size, respectively. The overall positioning of buttons differs with the hand size of a user, though almost the same kinds of buttons are positioned in almost the same manner. In the input device of one embodiment of the present invention, the overall positioning of buttons can be changed, which offers an optimized input environment to users with a variety of physiques, for example.

Figure 11C:
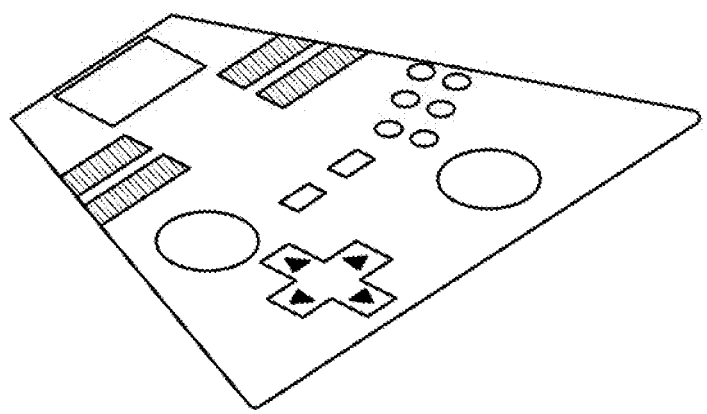

FIGS. 11A to 11C are described more specifically. FIGS. 11A to 11C show examples of buttons positioned in the input device 100 used as a game controller. The rectangular input device 100 may be partly bent to be used as the controller, or an isosceles trapezoid input device 100 may be fabricated and used as the controller. The input device 100 displays images of a start button 204, a select button 205, a control pad 201, an input button 202, an analog stick 203, and the like, which function as buttons. The input device 100 may be mountain-folded along a dotted line 210 in FIG. 11B, which facilitates the pressing of a button 211 and a button 212 with a forefinger or a middle finger.

After the overall positioning is selected and determined (S005), the details are determined in the next step.

Then, the positions of the buttons are customized (S006). Even after the preferred positioning is selected from the presets and the overall positioning is determined, the positioning does not necessarily meet the user's requirements. In some cases, the preferred positioning of buttons is not preset. Thus, a user freely changes or determines the number, type, size, position, direction, shape, design, color, or the like of buttons. Furthermore, a time-dependent element such as the motion or blinking of buttons is determined. FIG. 11C illustrates an example of the input device 100 with customized button positioning.

Optimized input devices are more strictly limited as they have more complicated usage and users have higher operating performance. Highly dedicated input devices have a low demand and therefore cannot be mass-produced to have high costs; furthermore, a larger number of input devices need to be prepared with an increase in the number of usages and users. Moreover, the ease of operation of an input device dedicated for complicated usage is not sufficiently improved by a designer in some cases, i.e., a user needs to learn a lot the operation of the input device to control the input device at will.

In contrast, in the input device of one embodiment of the present invention, the positioning of buttons can be freely customized in accordance with usages or users, which eliminates the need for preparation of a large number of input devices. In addition, the positioning of buttons can be customized again even after the input device starts to be used; therefore, a user can improve the ease of operation of the input device for complicated usage in accordance with his/her skill. This shortens the time for the user to learn flexible control. A feature of the input device of one embodiment of the present invention is that the positioning of buttons can be customized.

After the button positioning is determined (S007), a haptic effect is set (S008). By determining the haptic effect that is produced when a button is pressed or touched, information given to a user by touch can be selected in advance. In addition, a haptic effect may be set to be produced under specific conditions based on information input from a device connected to the input device, and the information may be transmitted to a user.

A preview is performed after all the setting is completed (S009). It is checked whether the setting is preferred by a user (S010), otherwise the setting is started again (going back to S001). When the preferred setting is confirmed, the setting is updated and stored (S011) and the use of the input device is started with the newly positioned buttons. Note that the positioning of buttons and the like can be set again by the intention of the user.

<Description on Positioning of Button 2>

Another flow example of selection and determination of positioning of an input button in the input device of one embodiment of the present invention will be described with reference to FIG. 16. Note that the aforementioned description in FIG. 10 can be referred to as appropriate.

Figure 16:
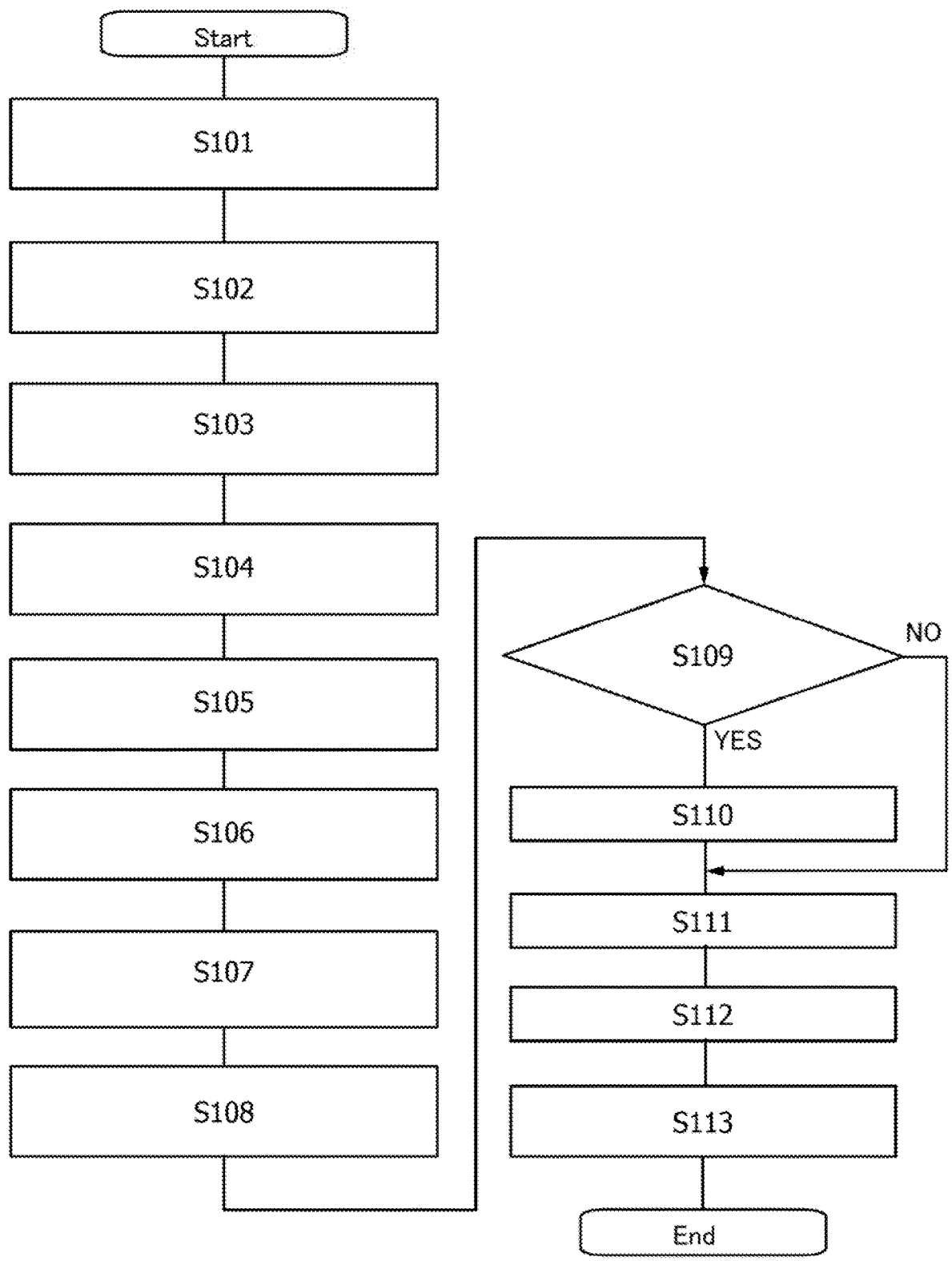
FIG. 16 is a flowchart showing the selection and determination of the positioning of buttons.

The flow shown in FIG. 16 is focused on the setting of button positioning particularly in consideration of information on hand size. Note that in this specification and the like, the hand size does not necessarily refer to the size of the whole hand and only needs to include the size of a part relating to the input to the input device. In the case where a user operates the input device with a body part other than the hand, the setting of positioning of buttons may be affected by information on the size of that body part, and furthermore, may be affected not by the whole body part but by part of it. Hence, the following description can also be applied to the cases where the positioning of buttons is set in accordance with the size of part of the hand, the size of a body part other than the hand, and the size of part of the body part other than the hand.

First, for preparation of reading information on the user's hand size as accurately as possible, a display portion displays a screen to instruct the input device to be put on a plane surface (S101) and senses that a housing has been put on the plane surface (S102). Note that the input device is not necessarily put on the plane surface as long as the hand size can be read, and in that case, the steps S101 and S102 may be skipped.

Next, to read the hand size of a user, the display portion displays a screen to instruct the user to put his/her hand on a touch panel of the input device (S103), whereby information on the size of the hand put on the touch panel is acquired (S104). The information on the hand size can be obtained from the shape of the put hand. For example, some kinds of touch panels can acquire as information a palm size, a finger length, the position of a finger joint, a finger width, and the like. In touch panels incapable of multiple input, the information on the hand size may be obtained by another method. For example, a user's thumb is put on the outer edge of a vertex of a touch panel and his/her little finger is touched on any part of the touch panel with the hand opened comfortably, which allows the measurement of the width of the hand. When a user's wrist is moved to the outer edge of the touch panel and the tip of his/her middle finger is touched on the touch panel, the length of the hand can be measured. Alternatively, the information on the hand size may be acquired in the following manner: a ruler is displayed on the display portion and a user's hand is put thereon so that the user can measure his/her hand size to input it to the input device. In the case of a touch panel capable of multipoint sensing, the hand width may be measured by making user's thumb and little finger touch the panel simultaneously, and the hand length may be measured by making his/her palm and middle finger touch the panel simultaneously. The acquired information on the hand size may be transmitted to a control portion of the input device.

Next, the display portion displays a screen to instruct the user to change the shape of the housing so as to suit the usage of the input device (S105). The shape of the input device is changed to provide information on the shape (S106). These steps are important for determining the kinds and positions of displayed buttons. For example, in the case where the input device is rolled, the use with a hand, such as a remote controller, can be expected. In that case, preset buttons described later may be preferentially displayed assuming that they are pressed with a hand. Note that the shape of the housing may be judged from, for example, all the stress measured by stress sensors provided in different parts of the housing. Note that the possible shapes of the input device may be determined in advance and one of them may be selected and determined by a user. For example, the input device is used as the game controller illustrated in FIGS. 11A to 11C, the intended shape is input to the input device in advance and the steps of changing the shape is displayed on the display portion of the input device. Note that the shape of the housing is not necessarily sensed when the positioning of buttons can be determined without information on the shape. The information on the shape of the input device may be transmitted to the control portion of the input device.

Then, preset button positioning to be displayed next is adjusted with use of the acquired information on the hand size and the housing shape (S107). For example, in the case where the input device is used as a game controller, information on the shape of a normal housing is input in advance to the input device of one embodiment of the present invention and is compared with the acquired information on the housing shape, so that a difference from the normal state can be measured. Then, the preset button positioning is changed to reflect the difference. Furthermore, information on the size of a normal hand is input in advance to the input device of one embodiment of the present invention and is compared with the acquired information on the hand size, so that a difference from the normal hand size can be measured. Then, the preset button positioning is changed to reflect the difference.

Next, the adjusted preset button positioning is displayed on the display portion and a preset selection screen is displayed (S108). Plural kinds of presets are input in advance. Each preset button positioning is adjusted in the above step S107, and the adjusted button positioning is displayed when plural presets are selected. The preset is not selected by a user feeling uncomfortable when a normal bottom positioning is displayed; however, the user can use the adjusted buttons comfortably and select the preset in some cases. That is, this flow can provide the user with more optimized button positioning.

Then, the user determines whether his/her preferred positioning of buttons is preset or not (S109). If the user finds a preferred preset, he/she selects the preset (S110) and proceeds to customize the button positioning (S111). If the user does not find the preferred positioning, the kinds, positions, sizes, and the like of displayed buttons are customized to be determined (S111).

In the step of customizing buttons (S111), the user changes the kinds, positions, sizes, and the like of displayed buttons as he/she likes. In this step, an input environment suitable for each user can be provided. A feature of the input device of one embodiment of the present invention is that the input environment can be widely changed. After the customization of buttons is completed, the button positioning is determined (S112).

Finally, the determined button positioning is stored in a memory device in the input device or an external memory device and transmitted to the display portion to display buttons; thus, the input device is made available (S113).

Through the above flow, an input environment optimized for the user can be provided. Note that one embodiment of the present invention does not need to have all the above steps and one or more of the steps may be omitted.

<Description on Positioning of Button 3>

Another flow example of selection and determination of positioning of an input button in the input device of one embodiment of the present invention will be described with reference to FIG. 17. Note that the aforementioned description in FIG. 10 and FIG. 16 can be referred to as appropriate.

Figure 17:
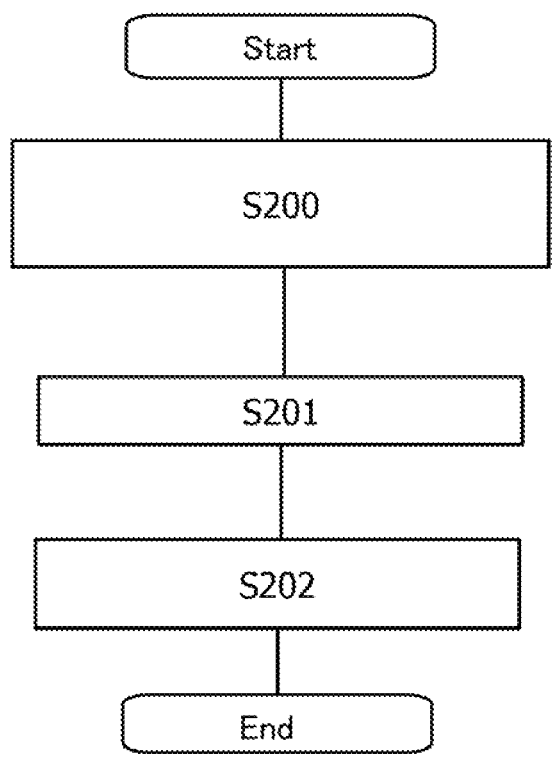
FIG. 17 is a flowchart showing the selection and determination of the positioning of buttons.

The flow shown in FIG. 17 is focused on the setting of button positioning particularly in consideration of information on hand size.

First, information on the size of a user's hand put on a touch panel is acquired (S200) and then is transmitted to a control portion. The control portion receiving the information determines the position of a button (S201), generates information on the button positioning, and transmits the information to a display portion. The display portion receiving the information on the button positioning displays a button (S202).

<Block Diagram of Input Device>

Figure 12:
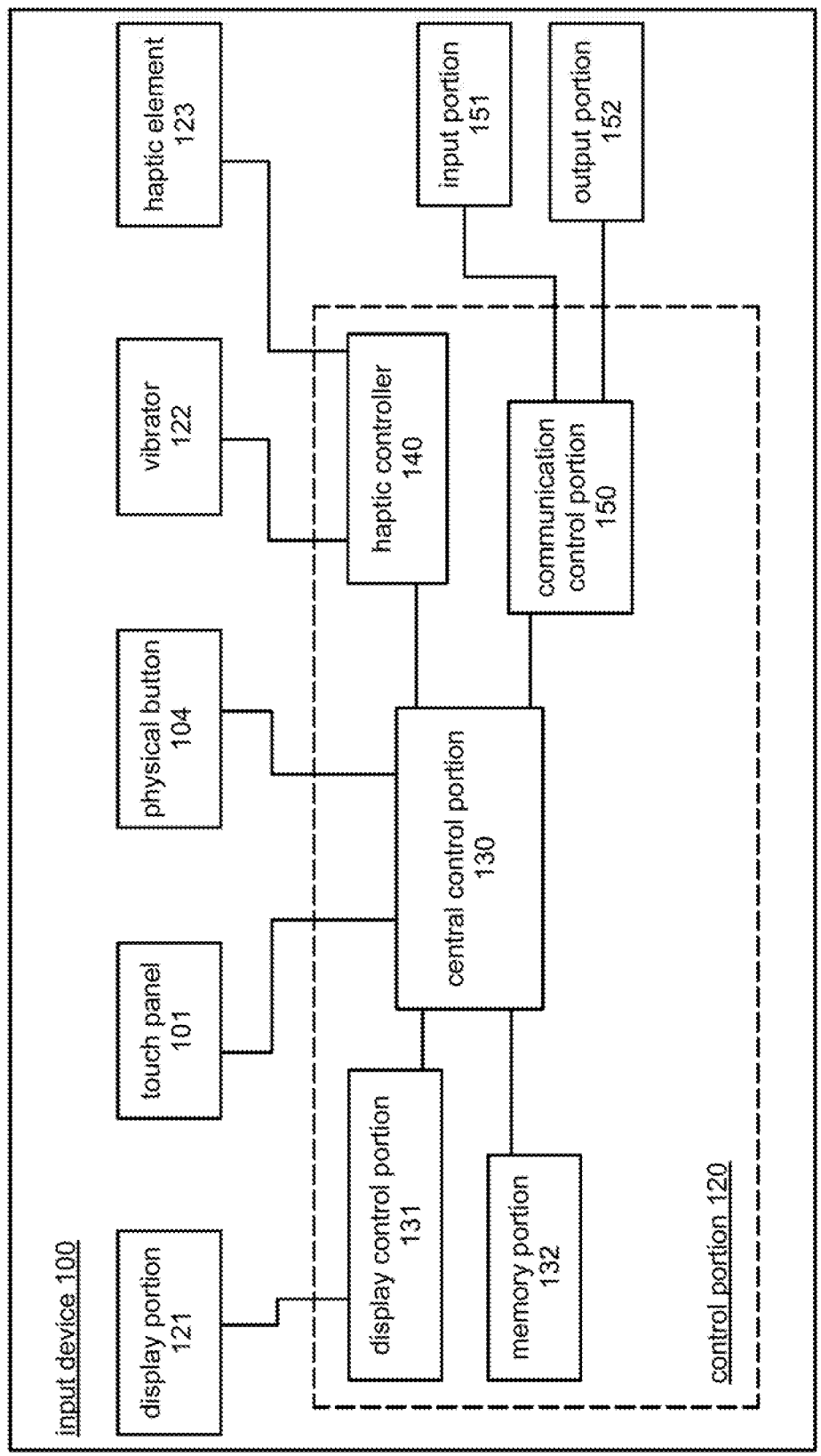
FIG. 12 is a block diagram illustrating a configuration of an input device.

Next, a configuration example of the input device 100 of one embodiment of the present invention will be described with reference to the block diagram of FIG. 12. The input device 100 of one embodiment of the present invention includes a display portion 121, the touch panel 101, a vibrator 122, a control portion 120, and the like. The control portion 120 includes a central control portion 130, a display control portion 131, a memory portion 132, a haptic controller 140, and a communication control portion 150. The communication control portion 150 is connected to an input portion 151 and an output portion 152.

The input device 100 may include the physical button 104 as an input means other than the touch panel. The physical button 104 preferably has a simple, basic function such as starting and stopping of the input device 100. The physical button 104 may be configured to transfer from a normal state to a state of setting button positioning when quickly pressed twice. The physical button 104 itself can be configured to be customized by a user to have a function meeting the intended use.

The display portion 121 of the input device 100 is configured to display a button or information. The central control portion 130 determines the position of the button displayed on the display portion 121 on the basis of the information stored in the memory portion 132, and transmits the positioning to the display control portion 131. The display control portion 131 generates control information of the display portion 121 on the basis of the transmitted button positioning and transmits the control information to the display portion 121. The display portion 121 displays the button on the basis of the transmitted control information.

The touch panel 101 is a main input means of the input device 100. The touch panel 101 detects contact and transmits the detected information to the central control portion 130. The central control portion 130 recognizes the input to the input device 100 from information on the touched part, the contact period, the contact intensity, and the like. For example, when a user presses a button while holding the input device 100, the central control portion 130 judges whether the contact is due to holding or button pressing to recognize the input.

The contact intensity may be measured by the contact area: a small (large) contact area means pressing with a low (high) intensity. A user's finger may be identified from the shape of a touched part, and recognized as information. For example, touch on a part with a button and its periphery may be detected to find the shape of the touched part and which finger is used. In that case, the central control portion 130 determines whether the same part on the touch panel is touched with a forefinger or a thumb and generates the information, so that a device connected to the input device can have different functions.

The input/output of a haptic effect is achieved by the haptic controller 140, a haptic element 123, the vibrator 122, and the like. Note that the haptic element having an input function is also referred to as a haptic input element. For example, when a haptic effect relating to vibration is transmitted to a user of the input device 100, the central control portion 130 transmits information on vibration to the haptic controller 140, and the haptic controller 140 generates the operation information of a vibrator and transmits it to the vibrator 122. The vibrator 122 vibrates with the transmitted operation information. Note that when a haptic effect other than vibration is transmitted to the user, the corresponding haptic element 123 is provided. For example, in the case where the input device 100 is configured to transmit heat, a heat generator is provided; in the case where the input device 100 is configured to transmit the texture of a surface, a component for changing the texture is provided. In the case where a button displayed on the display portion has physical unevenness to give the user the sense of touch of the button, a component having surface unevenness is provided. The function of the haptic element 123 may be partly achieved by the vibrator 122. For example, in the case where the vibrator 122 is a piezoelectric element, the vibrator 122 can function as a vibrator and a component for sensing the external force.

In the case of an input device capable of sensing information other than contact, the corresponding haptic element 123 is provided. For example, in the case where the temperature of a user's hand is to be sensed, a temperature measure is provided as the haptic element 123. In the case where the pressure applied to the input device by a user is to be sensed, a pressure sensor is provided as the haptic element 123.

The input information recognized by the input device 100 is output to an external device connected to the input device 100. The input device 100 may be configured to receive information from the external device. The input/output of information to/from the external device is controlled by the communication control portion 150. The communication control portion 150 receives the input information from the central control portion 130, converts the information into a mode that can be read by the external device, and transmits the information to the external device through an output portion 152. The communication control portion 150 also receives information from the external device through an input portion 151 and transmits the information to the central control portion 130. The connection with the external device may be performed with or without a wire. The input portion 151 and the output portion 152 may be integrated to be a component. The connection with the external device may be performed using a USB standard, which allows a wide variety of usage.

In this embodiment, configuration examples, setting examples, use examples, and the like of the input device of one embodiment of the present invention have been described. The input device of one embodiment of the present invention can be used in a wide variety of modes by a wide variety of users. In addition, haptic information as well as information on button pressing can be detected. The haptic effect can also be transmitted to a user of the input device.

<Storage Battery>

A storage battery may be incorporated in the input device of one embodiment of the present invention. The storage battery may have flexibility and may change in shape with the deformation of the input device. The storage battery may overlap with the display portion or the touch panel. Alternatively, the storage battery may be mounted on an edge of the input device. An example of the storage battery is described below.

Figure 13A:
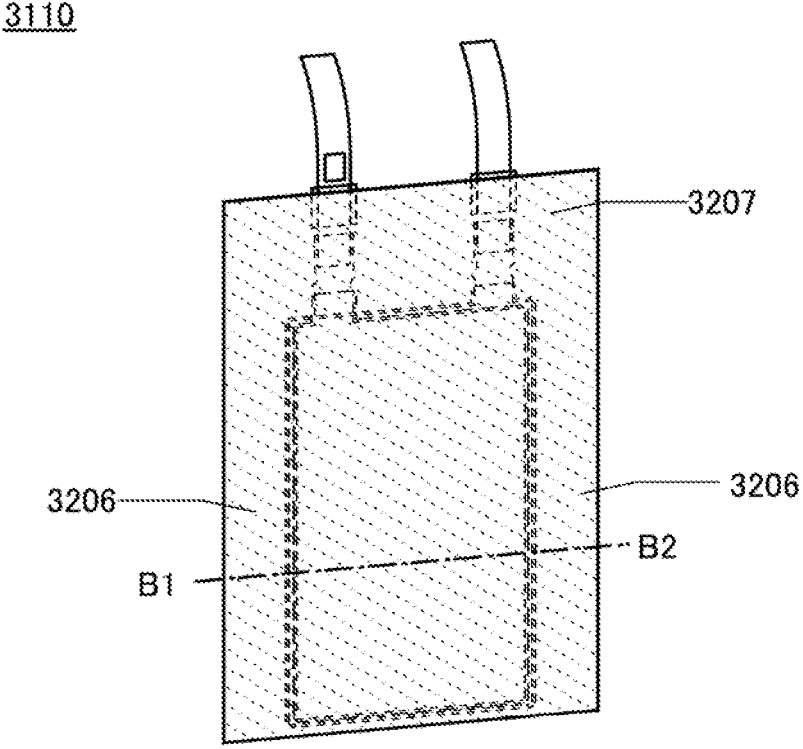
FIGS. 13A and 13B illustrate a structure of a storage battery used in an input device.
Figure 13B:
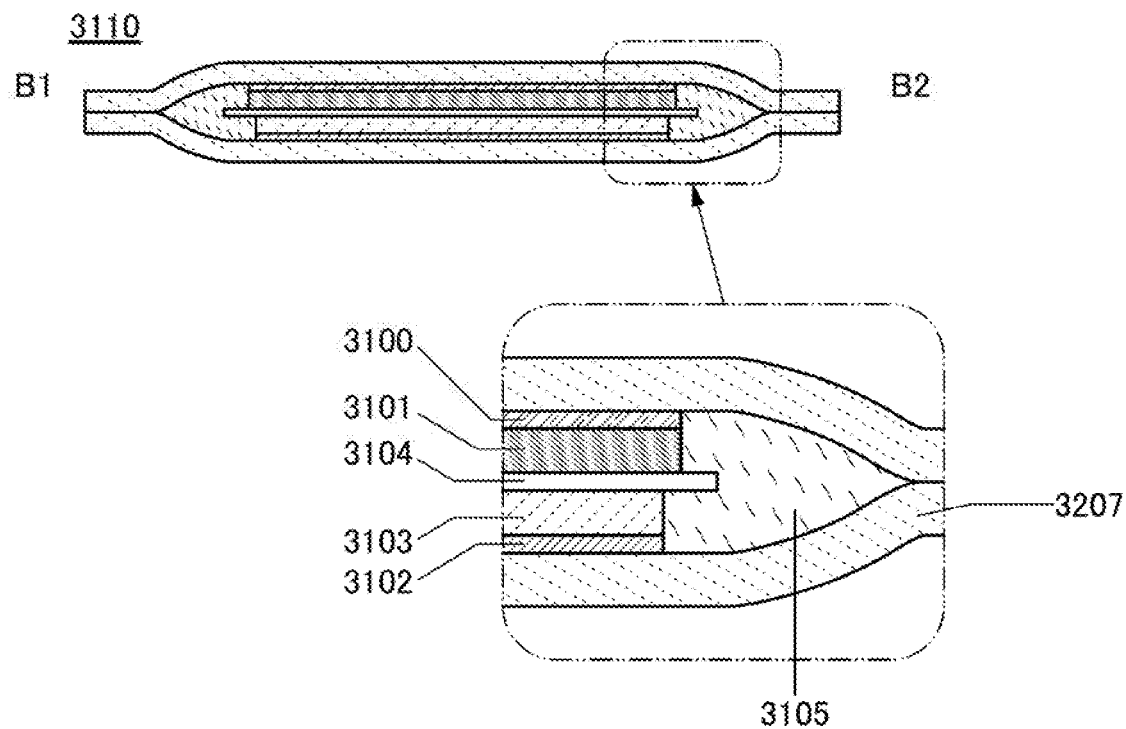

For example, a lithium-ion storage battery can be used as the storage battery. A structure of a lithium-ion storage battery 3110 is described with reference to FIGS. 13A and 13B. FIGS. 13A and 13B are a perspective view and a cross-sectional view of the lithium-ion storage battery 3110, respectively.

<<Structure of Positive Electrode>>

A positive electrode will be described. The positive electrode includes a positive electrode active material layer 3101 and a positive electrode current collector 3100.

As the positive electrode active material used for the positive electrode active material layer 3101, a material into and from which carrier ions such as lithium ions can be inserted and extracted can be used. Examples of the material include a lithium-containing material with an olivine crystal structure, a layered rock-salt crystal structure, or a spinel crystal structure.

Typical examples of the lithium-containing material with an olivine crystal structure ($LiMPO_4$ (general formula) (M is Fe(II), Mn(II), Co(II), or Ni(II))) include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

For example, lithium iron phosphate ($LiFePO_4$) is preferable because it properly has properties necessary for the positive electrode active material, such as safety, stability, high capacity density, high potential, and the existence of lithium ions which can be extracted in initial oxidation (charge).

Examples of the lithium-containing material with a layered rock-salt crystal structure include lithium cobalt oxide ($LiCoO_2$), $LiNiO_2$, $LiMnO_2$, $Li_2MnO_3$, a NiCo-containing material (general formula: $LiNi_xCo_{1-x}O_2$ (0<x<1)) such as $LiNi_{0.8}Co_{0.2}O_2$, a NiMn-containing material (general formula: $LiNi_xMn_{1-x}O_2$ (0<x<1)) such as $LiNi_{0.5}Mn_{0.5}O_2$, a NiMnCo-containing material (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$—$LiMO_2$ (M=Co, Ni, or Mn), and the like can be given as the examples.

In particular, $LiCoO_2$ is preferable because it has high capacity and higher stability in the air and higher thermal stability than $LiNiO_2$, for example.

Examples of the lithium-containing material with a spinel crystal structure include $LiMn_2O_4$, $Li_{1+x}Mn_{2-x}O_4$ (0<x<2), $LiMn_{2-x}Al_xO_4$ (0<x<2), and $LiMn_{1.5}Ni_{0.5}O_4$.

A small amount of lithium nickel oxide ($LiNiO_2$ or $LiNi_{1-x}M_xO_2$ (0<x<1, M=Co, Al, or the like)) is preferably added to a lithium-containing material with a spinel crystal structure that contains manganese, such as $LiMn_2O_4$, because the dissolution of manganese and the decomposition of an electrolytic solution can be inhibited.

Alternatively, a composite oxide represented by $Li_{(2-j)}MSiO_4$ (general formula) (M is Fe(II), Mn(II), Co(II), or Ni(II); 0≤j≤2) may be used as the positive electrode active material. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound represented by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound include $Fe_2(MnO_4)_3$, $Fe_2(SO_4)_3$, and $Li_3Fe_2(PO_4)_3$. Further alternatively, for example, a compound represented by $Li_2MPO_4F$, $Li_2MP_2O_7$, or $Li_5MO_4$ (general formula) (M=Fe or Mn), a perovskite fluoride such as $NaFeF_3$ or $FeF_3$, a metal chalcogenide (a sulfide, a selenide, or a telluride) such as $TiS_2$ or $MoS_2$, a lithium-containing material with an inverse spinel structure such as $LiMVO_4$, a vanadium oxide ($V_2O_5$, $V_6O_{13}$, $LiV_3O_8$, or the like), a manganese oxide, or an organic sulfur compound can be used as the positive electrode active material.

In the case where carrier ions are alkali metal ions other than lithium ions, or alkaline-earth metal ions, the following may be used as the positive electrode active material: a compound or an oxide that is obtained by substituting an alkali metal (e.g., sodium or potassium) or an alkaline-earth metal (e.g., calcium, strontium, barium, beryllium, or magnesium) for lithium in any of the above-mentioned compounds or oxides. For example, the positive electrode active material may be a sodium-containing layered oxide such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

The average diameter of primary particles of the positive electrode active material is preferably greater than or equal to 50 nm and less than or equal to 100 μm.

The positive electrode active material and a negative electrode active material have a main role in battery reactions of the storage battery, and receive and release carrier ions. To increase the lifetime of the storage battery, a material that has a small amount of capacity relating to irreversible battery reactions and has high charge and discharge efficiency is preferably used for the active materials.

The active material is in contact with an electrolytic solution. When the active material reacts with the electrolytic solution, the active material is lost and deteriorates by the reaction, which decreases the capacity of the storage battery. Therefore, it is preferable that such a reaction not be caused in the storage battery so that the storage battery hardly deteriorates.

Examples of the conductive additive of the electrode include acetylene black (AB), graphite (black lead) particles, carbon nanotubes, graphene, and fullerene.

A network for electrical conduction can be formed in the electrode by the conductive additive. The conductive additive also allows the maintenance of a path for electric conduction between the positive electrode active material particles. The addition of the conductive additive to the positive electrode active material layer increases the electrical conductivity of the positive electrode active material layer 3101.

As the binder, polyvinylidene fluoride (PVDF) as a typical example, polyimide, polytetrafluoroethylene, polyvinyl chloride, ethylene-propylene-diene polymer, fluorine rubber, polymethyl methacrylate, polyethylene, nitrocellulose, or the like can be used.

The binder content in the positive electrode active material layer 3101 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The conductive additive content in the positive electrode active material layer 3101 is preferably greater than or equal to 1 wt % and less than or equal to 10 wt %, more preferably greater than or equal to 1 wt % and less than or equal to 5 wt %.

In the case where the positive electrode active material layer 3101 is formed by a coating method, the positive electrode active material, the binder, the conductive additive, and a dispersion medium are mixed to form an electrode slurry, and the electrode slurry is applied to the positive electrode current collector 3100 and dried.

The positive electrode current collector 3100 can be formed using a material which has high conductivity and is not alloyed with a carrier ion of lithium or the like, such as stainless steel, gold, platinum, aluminum, or titanium, or an alloy thereof. Alternatively, an aluminum alloy to which an element that improves heat resistance, such as silicon, titanium, neodymium, scandium, or molybdenum, is added can be used. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, and nickel. The positive electrode current collector can have a foil-like shape, a plate-like shape (sheet-like shape), a net-like shape, a punching-metal shape, an expanded-metal shape, or the like as appropriate.

Through the above steps, the positive electrode of the lithium-ion storage battery can be formed.

<<Structure of Negative Electrode>>

Next, a negative electrode will be described with reference to FIG. 13A. The negative electrode includes a negative electrode active material layer 3103 and a negative electrode current collector 3102. Steps of forming the negative electrode will be described below.

Examples of the carbon-based material used as a negative electrode active material of the negative electrode active material layer 3103 include graphite, graphitizing carbon (soft carbon), non-graphitizing carbon (hard carbon), a carbon nanotube, graphene, and carbon black. Examples of the graphite include artificial graphite such as meso-carbon microbeads (MCMB), coke-based artificial graphite, or pitch-based artificial graphite and natural graphite such as spherical natural graphite. As the shape of the graphite, a flaky shape, a spherical shape, or the like can be used.

Other than the carbon-based material, a material that enables charge-discharge reactions by an alloying reaction and a dealloying reaction with lithium can be used for the negative electrode active material. For example, a material containing at least one of Ga, Si, Al, Ge, Sn, Pb, Sb, Bi, Ag, Zn, Cd, In, and the like can be used. Such elements have a higher capacity than carbon. In particular, silicon is preferably used because of its high theoretical capacity of 4200 mAh/g. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of its high charge and discharge capacity (900 mAh/g and 1890 mAh/cm$^3$).

When a nitride containing lithium and a transition metal is used, lithium ions are contained in the negative electrode active material and thus the negative electrode active material can be used in combination with a material for a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material; for example, a transition metal oxide that does not cause an alloy reaction with lithium, such as cobalt oxide (CoO), nickel oxide (NiO), or iron oxide (FeO), may be used. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The particle diameter of the negative electrode active material is preferably greater than or equal to 50 nm and less than or equal to 100 μm, for example.

Note that a plurality of materials for an active material can be combined at a given proportion both for the positive electrode active material layer 3101 and the negative electrode active material layer 3103. The use of a plurality of materials for the active material layer makes it possible to select the property of the active material layer in more detail.

Examples of the conductive additive in the electrode include acetylene black (AB), graphite (black lead) particles, carbon nanotubes, graphene, and fullerene.

A network for electric conduction can be formed in the electrode by the conductive additive. The conductive additive also allows maintaining of a path for electric conduction between the negative electrode active material particles. The addition of the conductive additive to the negative electrode active material layer increases the electric conductivity of the negative electrode active material layer 3103.

A typical example of the binder is polyvinylidene fluoride (PVDF), and other examples of the binder include polyimide, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

The content of the binder in the negative electrode active material layer 3103 is preferably greater than or equal to 1 wt % and less than or equal to 10 wt %, more preferably greater than or equal to 2 wt % and less than or equal to 8 wt %, still more preferably greater than or equal to 3 wt % and less than or equal to 5 wt %. The content of the conductive additive in the negative electrode active material layer 3103 is preferably greater than or equal to 1 wt % and less than or equal to 10 wt %, more preferably greater than or equal to 1 wt % and less than or equal to 5 wt %.

Then, the negative electrode active material layer 3103 is formed over the negative electrode current collector 3102. In the case where the negative electrode active material layer 3103 is formed by a coating method, the negative electrode active material, the binder, the conductive additive, and a dispersion medium are mixed to form a slurry, and the slurry is applied to the negative electrode current collector 3102 and dried. If necessary, pressing may be performed after the drying.

The negative electrode current collector 3102 can be formed using a highly conductive material that is not alloyed with a carrier ion of, for example, lithium, such as a metal typified by stainless steel, gold, platinum, iron, copper, titanium, and tantalum or an alloy thereof. Alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, and nickel. The negative electrode current collector 3102 can have a foil-like shape, a plate-like shape (sheet-like shape), a net-like shape, a cylindrical shape, a coil shape, a punching-metal shape, an expanded-metal shape, or the like as appropriate. The thickness of the negative electrode current collector 3102 is preferably greater than or equal to 5 μm and less than or equal to 30 μm.

Part of a surface of the electrode current collector may be provided with an undercoat layer using graphite or the like.

Through the above steps, the negative electrode of the lithium-ion storage battery can be formed.

<<Structure of Separator>>

A separator 3104 will be described. The separator 3104 may be formed using a material such as paper, nonwoven fabric, fiberglass, or synthetic fiber such as nylon (polyamide), vinylon (polyvinyl alcohol based fiber), polyester, acrylic, polyolefin, or polyurethane. It should be noted that a material that does not dissolve in an electrolytic solution described later needs to be selected.

More specifically, as a material for the separator 3104, high-molecular compounds based on a fluorine-based polymer, polyethers such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and fiberglass can be used either alone or in combination.

The separator 3104 needs to have an insulating property of inhibiting the contact between the electrodes, a property of holding the electrolytic solution, and ionic conductivity. As a method for forming a film having a function as a separator, a method for forming a film by stretching is given. Examples of the method include a stretching aperture method in which a melted polymer material is spread, heat is released from the material, and pores are formed by stretching the resulting film in the directions of two axes parallel to the film.

To set the separator 3104 in the storage battery, a method in which the separator is inserted between the positive electrode and the negative electrode can be used. Alternatively, a method in which the separator 3104 is placed on one of the positive electrode and the negative electrode and then the other of the positive electrode and the negative electrode is placed thereon can be used. The positive electrode, the negative electrode, and the separator are provided in the exterior body, and the exterior body is filled with the electrolytic solution, whereby the storage battery can be fabricated.

The separator 3104 with a size large enough to cover each surface of either the positive electrode or the negative electrode, in the form of a sheet or an envelope, may be fabricated to form the electrode wrapped in the separator 3104. In that case, the electrode can be protected from mechanical damages in the fabrication of the storage battery, which facilitates the handling of the electrode. The electrode wrapped in the separator and the other electrode are provided in the exterior body, and the exterior body is filled with the electrolytic solution, whereby the storage battery can be fabricated. FIG. 13B shows the cross-sectional structure of the storage battery including a pair of positive and negative electrodes; alternatively, a layered-type storage battery may also be fabricated using plural pairs of positive and negative electrodes.

The separator 3104 may include a plurality of layers. The separator 3104 formed by the above method has a limited range of film thicknesses and the sizes of pores in the film due to its material and mechanical strength. A first separator and a second separator each formed by a stretching method may be used together in the storage battery. The first separator and the second separator can be formed using one or more materials selected from the above-described materials or the other materials. Depending on the conditions of film formation, the conditions of film stretching, and the like, properties such as the size of pores in the film, the proportion of the volume occupied by pores (also referred to as porosity), and the film thickness can each be determined. By using the first separator and the second separator having different characteristics, the properties of the separators of the storage battery can be selected more variously than in the case of using one of the separators.

Furthermore, the storage battery may have flexibility. In the case where flow stress is applied to the flexible storage battery, the stress can be relieved by sliding of the first separator and the second separator at the interface between the first separator and the second separator. Therefore, the structure including a plurality of separators is also suitable as a structure of the separator in the flexible storage battery.

Through the above steps, the separator can be incorporated in the lithium-ion storage battery.

<<Components of Electrolytic Solution>>

An electrolytic solution 3105 used in the lithium-ion storage battery is preferably a nonaqueous solution (solvent) containing an electrolyte (solute).

As a solvent of the electrolytic solution 3105, a material in which carrier ions can transfer is used. For example, an aprotic organic solvent is preferably used, and one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as a solvent of the electrolytic solution 3105, safety against liquid leakage and the like is improved, and the thickness and weight of the lithium-ion storage battery can be reduced. Typical examples of the gelled high-molecular material include a silicone gel, an acrylic gel, an acrylonitrile gel, a polyethylene oxide-based gel, a polypropylene oxide-based gel, and a fluorine-based polymer gel.

Alternatively, when one or more kinds of ionic liquids (also referred to as room temperature molten salts) that have non-flammability and non-evaporability are used as the solvent for the electrolytic solution, the lithium-ion storage battery can be prevented from exploding or catching fire even when the lithium-ion storage battery internally shorts out or the internal temperature increases owing to overcharging or the like. Thus, the lithium-ion storage battery has improved safety.

The electrolytic solution used for the storage battery is preferably highly purified and contains a small amount of dust particles and elements other than the constituent elements of the electrolytic solution (hereinafter, also simply referred to as impurities). Specifically, the mass ratio of impurities to the electrolytic solution is less than or equal to 1%, preferably less than or equal to 0.1%, and further preferably less than or equal to 0.01%. An additive agent such as vinylene carbonate may be added to the electrolytic solution.

In the case of using lithium ions as carrier ions, as an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination at an appropriate ratio.

In the above description, lithium ions are used as the carrier ions in the electrolyte; however, carrier ions other than lithium ions can be used. When the carrier ions other than lithium ions are alkali metal ions or alkaline-earth metal ions, instead of lithium in the lithium salts, an alkali metal (e.g., sodium or potassium) or an alkaline-earth metal (e.g., calcium, strontium, barium, beryllium, or magnesium) may be used as the electrolyte.

Note that the electrolytic solution reacts with and corrodes the positive electrode current collector in some cases. In order to inhibit such corrosion, several weight percent of $LiPF_6$ is preferably added to the electrolytic solution, in which case a passive film is formed on a surface of the positive electrode current collector and inhibits the reaction between the electrolytic solution and the positive electrode current collector. Note that the concentration of $LiPF_6$ is less than or equal to 10 wt %, preferably less than or equal to 5 wt %, and further preferably less than or equal to 3 wt % in order that the positive electrode active material layer is not dissolved.

<<Structure of Exterior Body>>

Next, an exterior body 3207 will be described. As the exterior body 3207, a three-layer film can be used; for example, a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film. With such a three-layer structure, the passage of an electrolytic solution and a gas can be blocked and an insulating property and resistance to the electrolytic solution can be provided. The exterior body is folded inwardly, or two exterior bodies are stacked with the inner surfaces facing each other, in which case application of heat melts the materials on the overlapping inner surfaces to cause fusion bonding between the two exterior bodies. In this manner, a sealing structure can be formed.

A portion where the sealing structure is formed by fusion bonding or the like of the exterior body is referred to as a sealing portion. In the case where the exterior body is folded inwardly, the sealing portion is formed in the place other than the fold, and a first region of the exterior body and a second region of the exterior body that overlaps with the first region are fusion-bonded, for example. In the case where two exterior bodies are stacked, the sealing portion is formed along the entire outer region by heat fusion bonding or the like.

<<Flexible Storage Battery>>

With use of a flexible material selected from materials of the members described in this embodiment, a flexible lithium-ion storage battery can be fabricated. The flexible lithium-ion storage battery can be used as the power source of the input device having flexibility of one embodiment of the present invention.

Figure 14A:
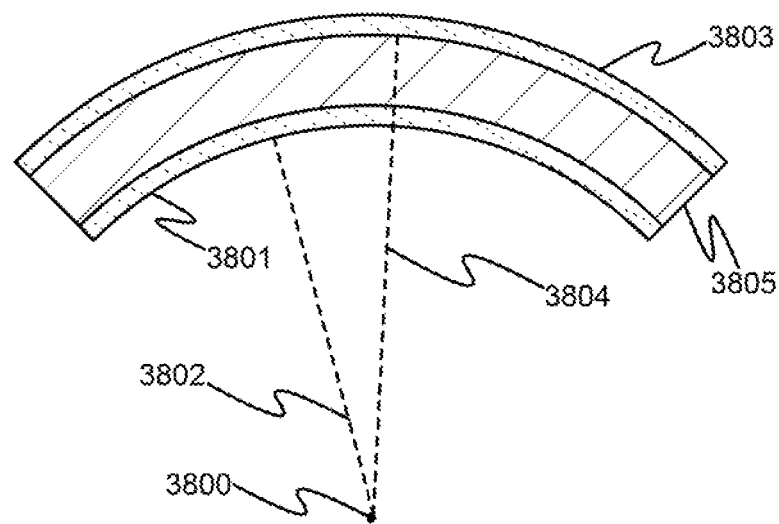
FIGS. 14A to 14D illustrate a storage battery having flexibility.
Figure 14B:
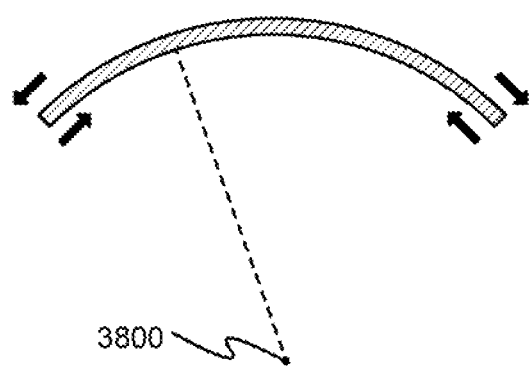

In the case of bending a storage battery in which a component 3805 including electrodes and an electrolytic solution is sandwiched between two films as exterior bodies, a curvature radius 3802 of a film 3801 closer to a curvature center 3800 of the storage battery is smaller than a curvature radius 3804 of a film 3803 farther from the curvature center 3800 (FIG. 14A). When the storage battery is curved and has an arc-shaped cross section, compressive stress is applied to a surface of the film on the side closer to the curvature center 3800 and tensile stress is applied to a surface of the film on the side farther from the curvature center 3800 (FIG. 14B).

When the flexible lithium-ion storage battery changes in form, a high stress is applied to the exterior bodies. However, by forming a pattern including projections or depressions on surfaces of the exterior bodies, the influence of a strain can be reduced even with the compressive stress and tensile stress due to the deformation of the storage battery. For this reason, the storage battery can change its form such that the exterior body on the side closer to the center of curvature has a curvature radius greater than or equal to 50 mm, preferably greater than or equal to 30 mm.

Figure 15A:
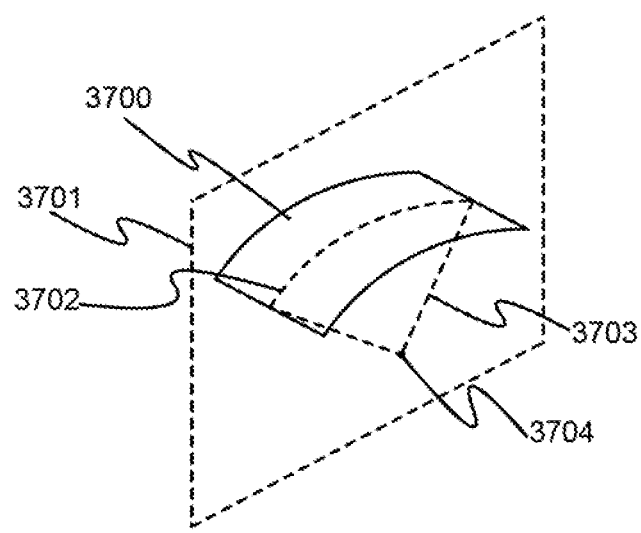
FIGS. 15A to 15C illustrate a radius of curvature.
Figure 15B:
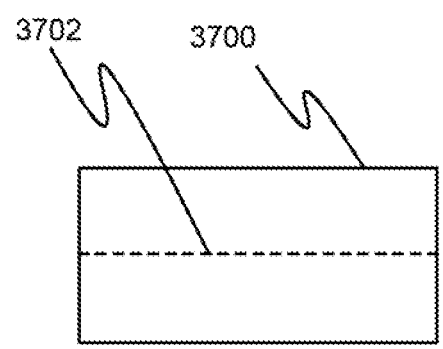
Figure 15C:
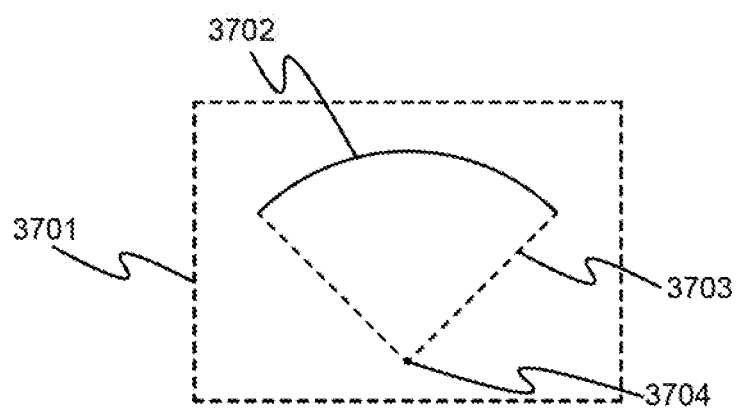

The radius of curvature of a surface will be described with reference to FIGS. 15A to 15C. In FIG. 15A, on a plane 3701 along which a curved surface 3700 is cut, part of a curve 3702 forming the curved surface 3700 is approximate to an arc of a circle, and the radius of the circle is referred to as a curvature radius 3703 and the center of the circle is referred to as a curvature center 3704. FIG. 15B is a top view of the curved surface 3700. FIG. 15C is a cross-sectional view of the curved surface 3700 taken along the plane 3701. When a curved surface is cut along a plane, the radius of curvature of a curve in a cross section differs depending on the angle between the curved surface and the plane or on the cut position, and the smallest radius of curvature is defined as the radius of curvature of a surface in this specification and the like.

Figure 14C:
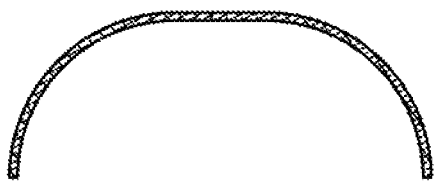
Figure 14D:

Note that the cross-sectional shape of the storage battery is not limited to a simple arc shape, and the cross section can be partly arc-shaped; for example, a shape illustrated in FIG. 14C, a wavy shape illustrated in FIG. 14D, or an S shape can be used. When the curved surface of the storage battery has a shape with a plurality of centers of curvature, the storage battery can change its form such that a curved surface with the smallest radius of curvature among radii of curvature with respect to the plurality of centers of curvature, which is a surface of the exterior body on the side closer to the center of curvature, has a curvature radius greater than or equal to 50 mm, preferably greater than or equal to 30 mm.

<<Assembly of Storage Battery and Aging>>

Next, the above components are combined and enclosed in the exterior body 3207, so that the positive electrode current collector 3100, the positive electrode active material layer 3101, the separator 3104, the negative electrode active material layer 3103, and the negative electrode current collector 3102 are stacked and enclosed in the exterior body 3207 together with the electrolytic solution 3105 as illustrated in FIGS. 13A and 13B.

Then, an aging process is performed. First, environmental temperature is kept at about room temperature for example, and constant current charge is performed to a predetermined voltage at a low rate. Next, a gas generated in a region inside the exterior body by charging is released outside the exterior body, and then charge is performed at a rate higher than that of the initial charge.

After that, the storage battery is preserved at relatively high temperatures for a long time. For example, the storage battery is kept at higher than or equal to 40° C. for longer than or equal to 24 hours.

After the storage battery is kept at high temperatures for a long time, gases generated in a region inside the exterior body is released again. Furthermore, the storage battery is discharged at a rate of 0.2 C at room temperature, charged at the same rate, discharged at the same rate again, and further charged at the same rate. Then, discharge is performed at the same rate, which terminates the aging step.

In the aforementioned manner, the storage battery used for the input device of one embodiment of the present invention can be fabricated.

In this embodiment, one embodiment of the present invention has been described. Note that one embodiment of the present invention is not limited to the above. For example, one embodiment of the present invention is not limited to the example of the input device, which has flexibility, in which the positions of buttons displayed on the touch panel can be changed, and which has an input/output function with a haptic effect. Depending on the case or circumstances, for example, one embodiment of the present invention does not necessarily have flexibility. The positions of buttons displayed on the touch panel are not necessarily variable. For example, one embodiment of the present invention does not necessarily have the input/output function with a haptic effect.

This application is based on Japanese Patent Application serial No. 2015-242577 filed with Japan Patent Office on Dec. 11, 2015, and Japanese Patent Application serial No. 2016-003115 filed with Japan Patent Office on Jan. 11, 2016, the entire contents of which are hereby incorporated by reference.

What is claimed is:

1. A system of an input device comprising:
a display portion;
a touch panel;
a control portion; and
a housing,
wherein the display portion is configured to display a screen to instruct the input device to be put on a plane surface,
wherein the display portion is configured to display a screen to instruct a user to put a user's hand on the touch panel,
wherein the touch panel is configured to acquire first information on a size of at least part of the user's hand and transmit the first information to the control portion,
wherein the display portion is configured to display a screen to instruct the user to change a shape of the housing suitably,
wherein the housing is configured to acquire second information on the shape of the housing and transmit the second information to the control portion,
wherein the control portion is configured to receive the first information and the second information,
wherein the control portion is configured to adjust preset button positioning on the basis of the first information and the second information, generate third information on the adjusted preset button positioning, and transmit the third information to the display portion,
wherein the display portion is configured to display a plurality of buttons on the basis of the received third information,
wherein the input device is configured to customize positions and sizes of the plurality of buttons,
wherein the input device is configured to generate fourth information on positioning of the plurality of buttons from the customized positions, store the fourth information, and transmit the fourth information to the display portion, and
wherein the display portion is configured to display the plurality of buttons on the basis of the received fourth information.

2. An input device configured to display a button in a display portion in a position determined by the system according to claim 1, and inform the user of a button held down when the button held down is sensed by the touch panel.

3. A method of driving an input device,
the input device comprising a display portion, a touch panel, a control portion, and a housing,
wherein the display portion is configured to display a screen to instruct the input device to be put on a plane surface, and
the method comprising:
displaying a screen on the display portion for instructing a user to put a user's hand on the touch panel;
transmitting first information on a size of at least part of the user's hand from the touch panel to the control portion;
displaying a screen on the display portion for instructing the user to suitably change a shape of the housing;
transmitting second information on the shape of the housing from the housing to the control portion;
adjusting preset button positioning by the first information and the second information in the control portion;
transmitting third information on the preset button positioning from the control portion to the display portion;
displaying a plurality of buttons by the third information on the display portion;
customizing positions and sizes of the plurality of buttons by the input device;
transmitting fourth information on positioning of the plurality of buttons by the positions from the input device to the display portion; and
displaying the plurality of buttons by the fourth information on the display portion.

* * * * *